United States Patent
Ochiai et al.

(10) Patent No.: US 7,581,751 B2
(45) Date of Patent: Sep. 1, 2009

(54) AIR BAG DEVICE

(75) Inventors: Fumiharu Ochiai, Nasushiobara (JP);
Fumitoshi Yasuhara, Utsunomiya (JP);
Yusuke Nishida, Moka (JP); Satoshi Kobayashi, Kashiwa (JP); Makoto Higano, Moriya (JP)

(73) Assignees: Honda Motor Co., Ltd., Tokyo (JP);
Autoliv Development AB, Vargarda (SE)

( * ) Notice: Subject to any disclaimer, the term of this patent is extended or adjusted under 35 U.S.C. 154(b) by 362 days.

(21) Appl. No.: 11/461,027

(22) Filed: Jul. 31, 2006

(65) Prior Publication Data
US 2007/0029765 A1 Feb. 8, 2007

(30) Foreign Application Priority Data
Aug. 5, 2005 (JP) ............................. 2005-227662
Aug. 5, 2005 (JP) ............................. 2005-227663
Aug. 5, 2005 (JP) ............................. 2005-227664

(51) Int. Cl.
*B60R 21/20* (2006.01)
*B60R 21/21* (2006.01)
(52) U.S. Cl. .................. 280/730.2; 280/730.1; 280/751
(58) Field of Classification Search ............. 280/730.2, 280/730.1, 751
See application file for complete search history.

(56) References Cited

U.S. PATENT DOCUMENTS

| | | | | |
|---|---|---|---|---|
| 5,259,642 A * | 11/1993 | Muller et al. | ............... | 280/732 |
| 5,316,336 A * | 5/1994 | Taguchi et al. | ........... | 280/730.2 |
| 5,921,576 A * | 7/1999 | Sinnhuber | ................ | 280/730.2 |
| 6,086,091 A * | 7/2000 | Heinz et al. | .............. | 280/728.3 |
| 6,217,061 B1 * | 4/2001 | Harland et al. | ........... | 280/730.2 |
| 6,378,896 B1 * | 4/2002 | Sakakida et al. | ......... | 280/730.2 |
| 6,508,486 B1 * | 1/2003 | Welch et al. | .............. | 280/730.2 |
| 6,616,175 B2 * | 9/2003 | Hofmann et al. | ......... | 280/728.3 |
| 6,773,031 B2 * | 8/2004 | Haig | ........................... | 280/749 |
| 7,144,032 B2 * | 12/2006 | Lunt et al. | ................ | 280/728.2 |
| 7,350,852 B2 * | 4/2008 | Rust et al. | .............. | 296/187.06 |
| 7,374,201 B2 * | 5/2008 | Chausset | ................. | 280/728.3 |
| 7,384,063 B2 * | 6/2008 | Riester et al. | ............ | 280/730.2 |
| 7,390,017 B2 * | 6/2008 | Inoue et al. | .............. | 280/730.2 |
| 7,413,215 B2 * | 8/2008 | Weston et al. | ............ | 280/730.2 |
| 2005/0040629 A1 * | 2/2005 | Chausset | ................. | 280/730.2 |
| 2008/0048425 A1 * | 2/2008 | Hayata | ....................... | 280/751 |

FOREIGN PATENT DOCUMENTS

| | | | |
|---|---|---|---|
| JP | 05193433 A | * | 8/1993 |
| JP | 2860286 | | 12/1998 |
| JP | 2941879 | | 6/1999 |
| JP | 2004-067045 | | 3/2004 |

\* cited by examiner

*Primary Examiner*—Paul N Dickson
*Assistant Examiner*—Nicole Verley
(74) *Attorney, Agent, or Firm*—Rankin, Hill & Clark LLP

(57) ABSTRACT

An air bag device comprising an air bag that is disposed between an under-window panel and a lining that covers a cabin interior side thereof and deploys upward along an inside surface of the window; and an impact absorption member that interposes between the air bag and the lining.

14 Claims, 16 Drawing Sheets

AIR BAG DEVICE

BACKGROUND OF THE INVENTION

1. Field of the Invention

The present invention relates to an air bag device that deploys an air bag upward along a window from below the window.

Priority is claimed on Japanese Patent Application No. 2005-227662, filed Aug. 5, 2005, Japanese Patent Application No. 2005-227663, filed Aug. 5, 2005, and Japanese Patent Application No. 2005-227664, filed Aug. 5, 2005, the content of which is incorporated herein by reference.

2. Description of Related Art

Among air bag devices used as occupant protective devices mounted in a vehicle, there is known a door-mounted air bag device. As such an air bag device, there is known for example the air bag device disclosed in Japanese Patent No. 2941879, in which an air bag disposed between an inner panel of a door and a lining that covers the cabin interior side thereof is deployed upward along the inside surface of the window.

As shown in FIG. 17, in a typical structure of a vehicle door, members are provided for absorbing the impact when an occupant slams into the lining 500. Specifically, an upper impact absorption member 502 for protecting the shoulder of the occupant is provided at the upper part between the lining 500 and the inner panel 501. Also, a lower impact absorption member 503 for protecting the hip of an occupant is provided at the lower part between the lining 500 and the inner panel 501. When the aforementioned door mounted air bag device is provided in such a door, due to arrangement space considerations it is provided in place of the upper impact absorption member 502 for protecting a shoulder of an occupant. For this reason, when the occupant slams into the lining 500, the impact near the hip will be absorbed by the lower impact absorption member 503, and the impact near the shoulder will be absorbed by the lower part of the air bag. Thus, it is possible to sufficiently absorb an impact even with such an impact-absorbing structure. However, if further impact absorption were made possible its commercial value could be raised further.

Also, in the air bag device disclosed in, for example, Japanese Patent No. 2860286, the air bag is housed in a housing portion along a border of the vehicle window, so that when the air bag deploys, it deploys upward from below the window and along the inside surface of the window of the vehicle. When the air bag deploys, the upper portion of the air bag is inflated toward both sides along the window. At this time, centered on a coupling portion between the air bag and the housing portion, there is a risk of one axial end of the inflating bag tilting in an upward direction. However, an attachment device is conceived to prevent this tilting. Specifically, a structure is adopted consisting of a fabric flap that couples a portion of the air bag extending from the lower edge to the side edge thereof and the door in the front part of the lower window frame. This fabric flap projects so as not to overlap the air bag.

Such a structure can prevent tilting of the inflating portion, centered on the coupling portion between the air bag and the housing portion. However, when the air bag deploys, its position in the approaching/separating direction with respect to the window cannot be controlled.

Moreover, as another air bag device that deploys an air bag along the inside surface of a window, as shown, for example, in Japanese Unexamined Patent Application, First Publication No. 2004-67045, there is a roof side air bag that deploys the air bag downwardly from a roof side rail above the window. In order to stabilize the direction of deployment of the air bag, a member called a tension line is provided that couples a pillar and the air bag.

However, when using a roof side air bag and a door-mounted air bag device (that is, an air bag device that deploys an air bag upwardly from below a window) in combination, problems arise. That is, providing the tension line for the roof side air bag leads to structural difficulties that cause the deployment direction of the air bag to become unstable.

The present invention was achieved in view of the aforementioned circumstances and has as its first object to provide an air bag device that deploys an air bag upward from below a window and enables greater impact absorption.

A second object of the present invention is to provide an air bag device that can control the attitude in the approaching/separating direction with respect to the window during deployment of the air bag.

A third object of the present invention is to provide an air bag device that can stabilize the deployment direction of the air bag even when deploying the air bag upward from below a window.

SUMMARY OF THE INVENTION

The air bag device of the present invention is an air bag device that includes an air bag that is disposed between an under-window panel disposed under a window and a lining that covers a cabin interior side thereof and deploys upward along an inside surface of the window, and an impact absorption member that interposes between the air bag and the lining.

Since the impact absorption member is thus interposed between the air bag and the lining, when an occupant slams into the lining, the impact can be absorbed by both the lower portion of the air bag and the impact absorption member. Accordingly, greater impact absorption is made possible.

Also, the impact absorption member may include a first end portion that is joined to the under-window panel at an area below the air bag, a main portion that extends upward from the first end portion between the air bag and the lining, and a second end portion that is on an opposite side of the first end portion, and wherein a part of the main portion facing the second end portion deforms toward the cabin interior by being pressed by the air bag during deployment of the air bag.

According to this constitution, the impact absorption member is of a shape that extends upward between the air bag and the lining, with the first end portion thereof joined to the panel at an area below the air bag, and the second end portion thereof deforming to the cabin interior side by being pressed by the air bag during deployment of the air bag. For this reason, it is possible to ensure a long deformation stroke of the impact absorption member for impact absorption when the occupant slams into the lining. Accordingly, it is possible to more effectively absorb an impact. Also, the impact absorption member extends upward between the air bag and the lining. For this reason, the air bag can be guided by the impact absorption member during deployment, and so the deployment direction can be stabilized. In addition, since the impact absorption member extends upward between the air bag and the lining, the impact applied from the air bag to the lining during deployment can be reduced.

In addition, the impact absorption member may be constituted to be joined to the under-window panel at an area beside the air bag.

According to this constitution, since the impact absorption member is supported by the panel at a plurality of connection points, when the occupant slams into the lining, the impact can be effectively absorbed. Accordingly, greater impact absorption is made possible. Also, upon securing the impact absorbing performance, it is possible to make thin the thickness of the impact absorption member.

In addition, the air bag may be constituted to have a plurality of cells provided side-by-side in the lateral direction, with each cell disposed so as to overlap the panel by a predetermined length in the vertical direction during deployment.

According to this constitution, since the plurality of cells are provided side-by-side in the lateral direction, when the air bag deploys, each cell can deploy well in the vertical direction. In addition, the lower portions of the cells overlap the panel by a predetermined length in the vertical direction during deployment. For this reason, the cells, being guided by the panel, deploy well in the vertical direction. Thus, the deploying direction of the air bag can be stabilized. Moreover, the lower portion of the plurality of cells provided side-by-side in the lateral direction can be brought into contact with the panel. As a result, it is possible to secure the contact surface area between the air bag and the panel, and so when the occupant makes contact with the air bag from the cabin interior side, a reactive force therewith can be secured. Thereby, the performance as an air bag improves. In addition, each lower portion of the plurality of cells provided side-by-side in the lateral direction is supported by the panel. For this reason, when the occupant makes contact with the air bag from the cabin interior side, the portion of the air bag above the panel is hindered from falling over. As a result, the reactive force when the occupant makes contact with the air bag from the cabin interior side can be reliably secured. Thereby, the performance as an air bag improves.

In addition, the air bag device may include a housing portion for housing the air bag that is provided along a border of the window on the cabin interior side of the under-window panel, with the air bag having a side inflation portion that inflates in the lateral direction from a portion above the housing portion during deployment, and the lower portion of at least one of the cells overlapping the panel by a predetermined length in the vertical direction during deployment, and an upper portion thereof inclining so as to be positioned within the side inflation portion.

According to this constitution, the air bag has a side inflation portion that inflates in a lateral direction from a portion above the housing portion during deployment. The lower portion of at least one of the cells overlaps the panel by a predetermined length in the vertical direction during deployment, and the upper portion thereof inclines so as to be positioned within the side inflation portion. For this reason, when the occupant comes into contact with the air bag from the cabin interior side even at the side inflation portion, it becomes difficult to fall over. As a result, the reactive force when the occupant makes contact with the air bag from the cabin interior side can be reliably secured. Thereby, the performance as an air bag improves. Moreover, the lower portion of at least one of the cells overlaps the panel by a predetermined length in the vertical direction. And the upper portion thereof inclines so as to be positioned within the side inflation portion. For this reason, when for example housed in the housing portion, the side inflation portion folded to the housing portion side can be made to deploy quickly during deployment.

In addition, the air bag device may include a coupling member that couples the under-window panel and the air bag, with the coupling member coupling a predetermined region of the under-window panel and a predetermined region of the air bag in a range from the middle portion to the upper portion in the vertical direction during deployment of the air bag while overlapping at least one of a cabin interior side portion and cabin exterior side portion of the air bag during deployment.

According to this constitution, when the air bag deploys, the tensioning of the coupling member can control the attitude of the air bag in the cabin interior/exterior direction, that is, in the approaching/separating direction with respect to the window, during deployment of the air bag.

In addition, the coupling member may straddle the top of the air bag to be passed over the cabin interior side portion and the cabin exterior side portion thereof during deployment of the air bag.

According to this constitution, since the coupling member straddles the top of the air bag to be passed over the cabin interior side portion and the cabin exterior side portion thereof during deployment of the air bag, the air bag including the coupling member can be easily formed.

DETAILED DESCRIPTION OF THE INVENTION

Figure 1:
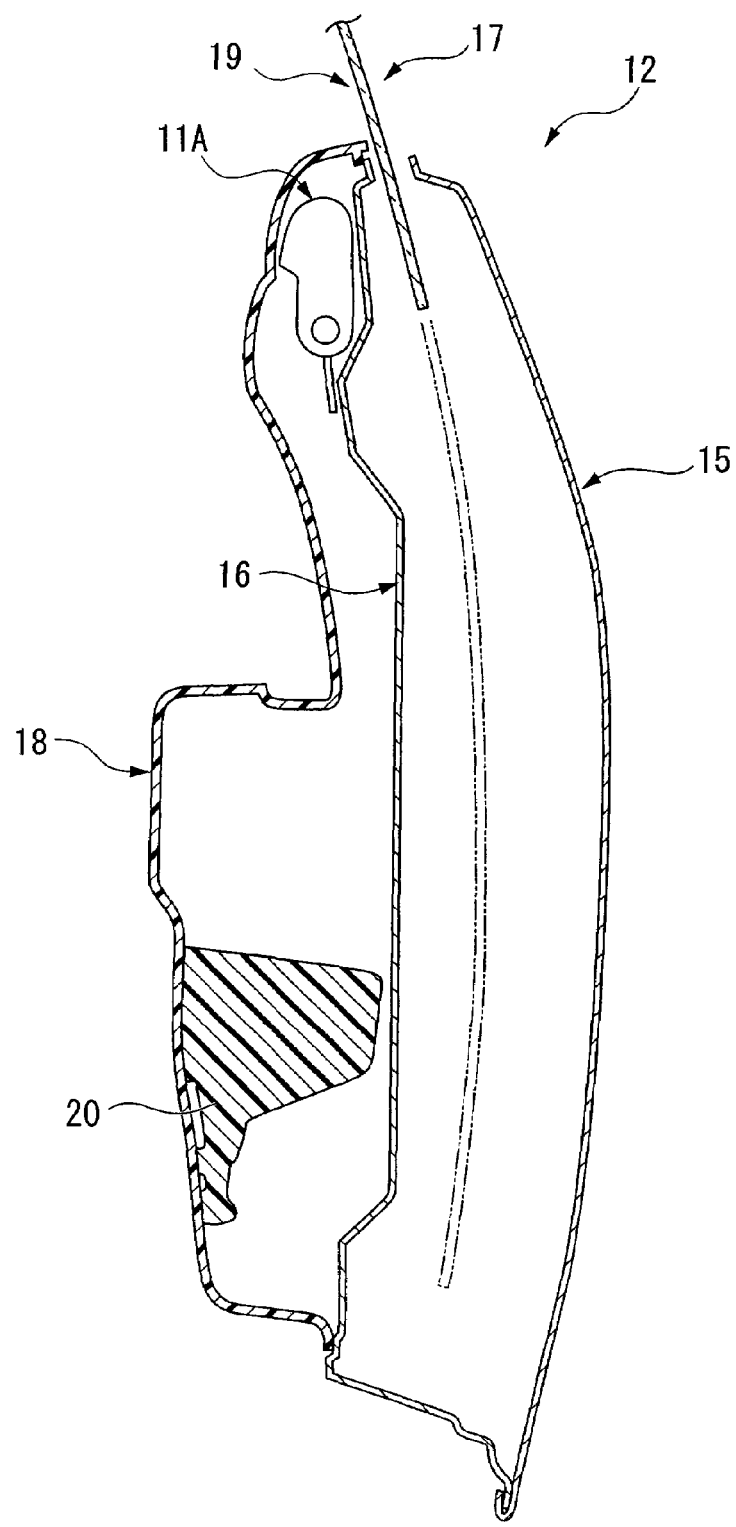
FIG. 1 is a sectional view schematically showing a door to which the air bag device according to the first embodiment of the present invention has been applied.

The embodiments of the air bag device according to the present invention are explained below, referring to the drawings.

First Embodiment

Figure 2:
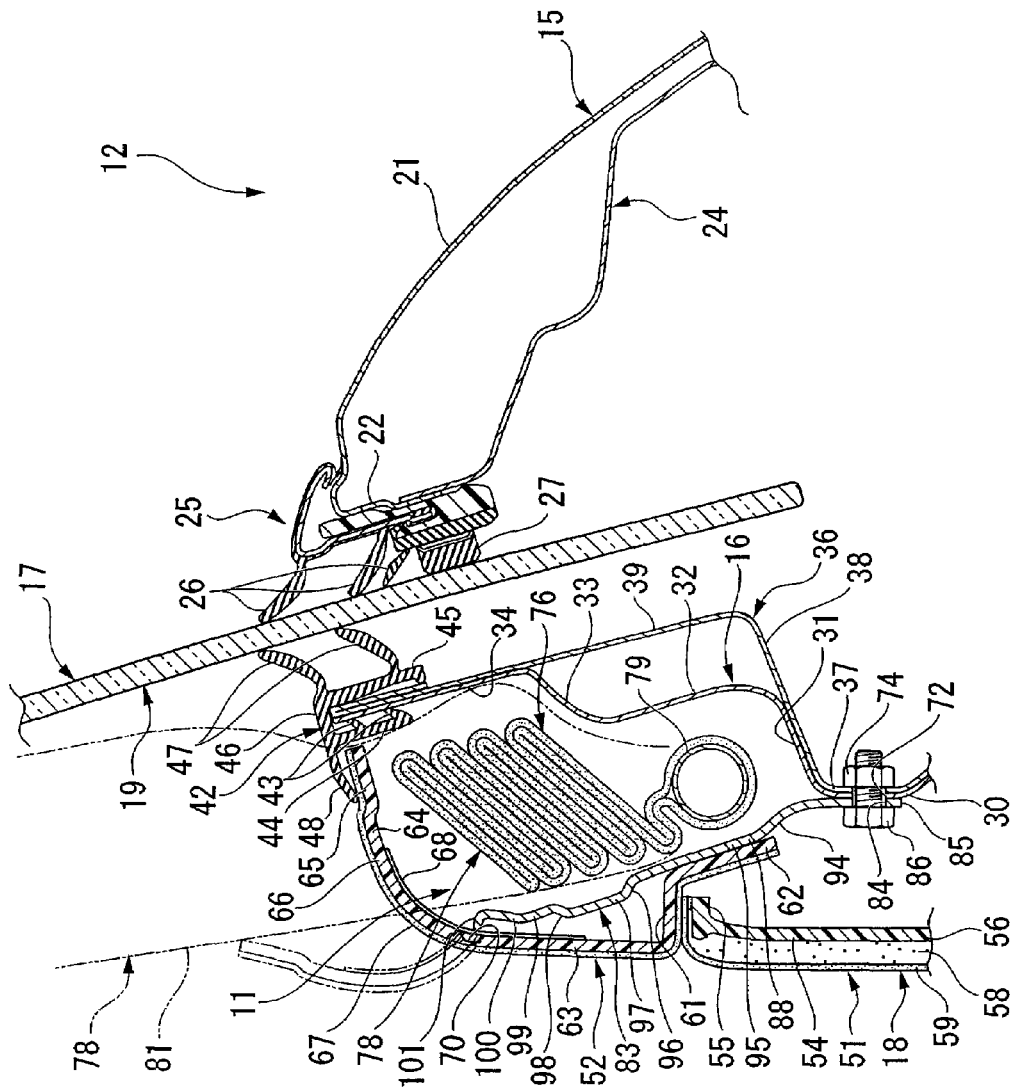
FIG. 2 is a sectional view showing the upper portion of a door to which the air bag device according to the first embodiment of the present invention has been applied.
Figure 3:
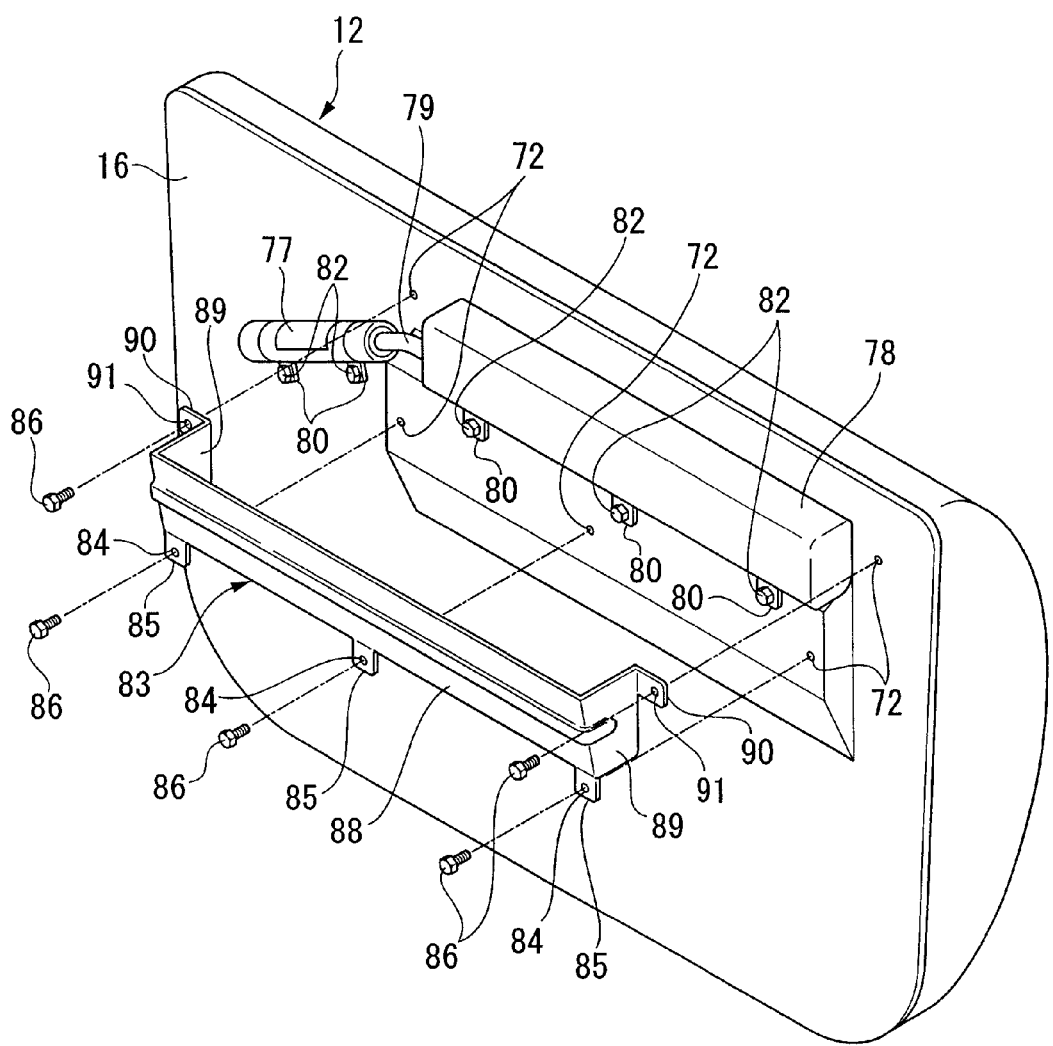
FIG. 3 is an exploded perspective view schematically showing the mounting portion of the air bag device according to the first embodiment of the present invention has been applied.

The first embodiment of the air bag device according to the present invention shall be explained first, referring to FIGS. 1 to 3.

FIG. 1 schematically shows the cross section of a door 12 on the right side of a vehicle in which an air bag device 11A according to the present embodiment is provided. In the drawing, the left side of the sheet is a cabin interior side, and the right side of the sheet is a cabin exterior side. Here, the vehicle to which the air bag device 11A is provided is an open-roof vehicle in which the roof can be opened and closed or is detachable. Note that in the explanation given below, the door 12 is in a closed state.

The door 12 includes an outer panel 15 made of metal, an inner panel (panel) 16 made of metal, a window glass 17 that can move up and down, and a door lining (lining) 18. The outer panel 15 is disposed along a vehicle longitudinal direction on the cabin exterior side, and composes the design surface of the cabin exterior side. The inner panel (panel) 16 is disposed along the vehicle longitudinal direction on the cabin interior side of the outer panel 15. The window glass 17 is disposed along the vehicle longitudinal direction, between the outer panel 15 and the inner panel 16, and rises so as to extend upward therebetween. The door lining (lining) 18 covers the cabin interior side of the inner panel 16, and forms a design surface of the cabin interior side. A window 19 is above the outer panel 15, the inner panel 16, and the door lining 18. The window 19 is opened and closed by raising and lowering the window glass 17 that constitutes a portion thereof. In other words, the outer panel 15, the inner panel 16, and the door lining 18 are disposed on the lower side of the window 19, that is, under the window. The outer panel 15 and the inner panel 16 made of metals are high rigidity portions of the door 12, and constitute a portion of the vehicle body when the door is closed. A lower impact absorption member 20 for absorbing the impact near the hip of the occupant when the occupant collides into the door 12 is provided at the lower portion between the inner panel 16 and the door lining 18.

FIG. 2 shows the cross section of the upper portion of the aforementioned door 12 in greater detail.

The outer panel 15 includes an external panel portion 21 and a joining panel portion 22. The external panel portion 21 constitutes the design surface of the cabin exterior side, with the upper portion thereof extending upward while sloping to the cabin interior side. The external panel portion 21 is folded back at the upper portion, with the joining panel portion 22 formed at the portion extending downward. An upper portion of an outer side reinforcement panel 24 made of metal is joined to the joining panel portion 22. This outer side reinforcement panel 24 serves to reinforce the upper portion of the outer panel 15, being disposed on the lower side of the joining panel portion 22 so as to approach the outer panel 15 side. An outer side weather strip 25 is attached to the upper side of the joined portion of the outer panel 15 and the outer side reinforcement panel 24. The outer side weather strip 25 seals the gap with the window glass 17, and includes a plurality of sealing lips 26 in a vertical direction and a square bar-shaped sealing member 27 disposed thereunder. The sealing lips 26 and the sealing member 27 seal by being in contact with the window glass 17.

The upper portion of the inner panel 16 includes an inside plate portion 30, a step plate portion 31, a middle plate portion 32, a step plate portion 33, and an upper plate portion 34. The step plate portion 31 extends upward while sloping from an upper edge of the inside plate portion 30 toward the cabin exterior side. The middle plate portion 32 extends upward while sloping from an external edge of the step plate portion 31 in a vehicle width direction to the cabin interior side. The step plate portion 33 extends upward while sloping from the upper edge of the middle plate portion 32 toward the cabin exterior side, and the upper plate portion 34 extends upward while sloping from the an external edge of the step plate portion 33 in the vehicle width direction to the cabin interior side. An inner reinforcing panel 36 made of metal is joined to the cabin exterior side of the upper portion of the inner panel 16 for reinforcing the upper portion of the inner panel 16.

The inner reinforcing panel 36 includes an inside plate portion 37, a step plate portion 38, and an upper plate portion 39. The inside plate portion 37 is joined to the cabin exterior side of the inside plate portion 30 of the inner panel 16. The step plate portion 38 extends upward while sloping from an upper edge of the inside plate portion 37 toward the cabin exterior side, and is joined to a bottom side of the step plate portion 31 of the inner panel 16. The upper plate portion 39 extends upward while sloping from the an external edge of the step plate portion 38 in the vehicle width direction to the cabin interior side and is joined to the cabin exterior side of the upper plate portion 34 of the inner panel 16. Thereby, the step plate portion 31, the middle plate portion 32, the step plate portion 33, and the upper plate portion 34 of the inner panel 16, together with the step plate portion 38 and the upper plate portion 39 of the inner reinforcing panel 36 form a closed-section structure.

An inner side weather strip 42 is attached at the upper portion of the joined portion of the upper plate portion 34 of the inner reinforcing panel 36 and the upper plate portion 39 of the inner reinforcing panel 36 so as to sandwich the upper plate portions 34 and 39. This inner side weather strip 42 seals the gap with the window glass 17, and includes pinching pieces 44 and 45 and a coupling portion 46. The pinching piece 44 is disposed on the cabin interior side of the upper plate portion 34, and includes a plurality of locking tongue pieces 43 that extend to the cabin exterior side. The pinching piece 45 is disposed on the cabin exterior side of the upper plate portion 39. Also, the coupling portion 46 couples the upper portions of the pinching pieces 44 and 45. That is, the upper plate portions 34 and 39 are made to be sandwiched by the pinching piece 44 and the pinching piece 45. Also, the inner side weather strip 42 includes a plurality of sealing lips 47 disposed in the vertical direction, and a contact tongue piece 48. The sealing lips 47 extend from the pinching piece 45 in the direction of the window glass 17, and make contact with the window glass 17. The contact tongue piece 48 extends to the cabin interior side to form an approximately coplanar surface with the coupling portion 46.

The door lining 18 includes a lining body 51 that constitutes middle and lower portions of the door lining 18, and an upper lining 52 that is disposed between the lining body 51 and the inner side weather strip 42.

The upper portion of the lining body 51 includes a comparatively hard lining core member 56, a comparatively soft lining base member 58, and a skin member 59. The lining core member 56 includes a main plate portion 54 and a projection plate portion 55. The main plate portion 54 is a portion that extends in the vertical direction, and the projection plate portion 55 is a portion that projects slightly from the upper edge of the main plate portion 54 to the cabin exterior side. The lining base member 58 covers the cabin interior side of the lining core member 56. Also, the skin member 59 covers the cabin interior side and the upper side of the lining base member 58.

The upper lining 52 includes a comparatively hard lining core member 66, a skin member 67, and a covering member 68. The lining core member 66 includes a mounting plate portion 61, a support plate portion 62, a middle plate portion 63, an upper plate portion 64, and a step plate portion 65. The mounting plate portion 61 is a portion horizontally arranged on the top of the lining body 51. The support plate portion 62 is a portion that extends downward while sloping from an external edge of the cabin exterior side of the mounting plate portion 61 to the cabin exterior side. The middle plate portion 63 is a portion that extends upward from an internal edge of the cabin interior side of the mounting plate portion 61. The upper plate portion 64 is a portion that extends upward, sloping to the cabin exterior side, while curving from an upper edge of the middle plate portion 63. The step plate portion 65 is a portion that extends to the cabin exterior side while forming a step downward from an external edge of the cabin exterior side of the upper plate portion 64. The skin member 67 as a whole covers the cabin interior side and the upper side of the lining core member 66. Also, the covering member 68 covers the cabin exterior side of the lining core member 66 from the middle plate portion 63 to the upper plate portion 64. The upper lining 52 is joined and fixed to the upper portion of the lining body 51 at the mounting plate portion 61.

The contact tongue piece 48 of the inner side weather strip 42 makes contact with the upper side of the step plate portion 65 of the upper lining 52. Also, at the boundary of the middle plate portion 63 and the upper plate portion 64 in the lining core member 66 of the upper lining 52, a groove 70 that extends in the longitudinal direction of the vehicle is formed at the portion covered by the covering member 68. In addition, the inside plate portion 30 of the inner panel 16 and the inside plate portion 37 of the inner reinforcing panel 36 are joined. A mounting hole 72 is formed in the inside plate portion 30 and the inside plate portion 37. A weld nut 74 is fixed at the position of the mounting hole 72 on the cabin exterior side of the inner reinforcing panel 36.

An air bag module 76 of the air bag device 11A of the present embodiment is attached so as to be disposed between the upper portion of the inner panel 16 and the upper portion of the door lining 18. The air bag module 76 includes an air bag 78, an inflator 77, and a pipe 79. The air bag 78 is, in a contracted state, folded so as to be successively piled upward, and is housed in this state. The inflator 77 is, as shown in FIG. 3, provided to the front (in the longitudinal direction of the vehicle) of the air bag 78. This inflator 77 is filled with a propellant that generates high pressure gas (fluid) by combustion. The pipe 79 is fitted to a lower side of the air bag 78 to couple the inflator 77 and a lower side of the air bag 78. As shown in FIG. 3, a plurality of mounting pieces 80 are provided with a lower portion of the air bag 78 and a lower portion of the inflator 77 in the longitudinal direction of the vehicle. The inflator 77 and the air bag 78 are fixed to the inner panel 16 by bolts 82 via these mounting pieces 80. Here, the air bag 78 is folded so as to be piled successively upward with respect to the pipe 79, which is a gas supply portion. For this reason, when the air bag deploys by the gas that the inflator 77 generates, it basically deploys upward. As shown in FIG. 2 and FIG. 3, the pipe 79 is positioned lower than the upper end portion of the inner panel 16. As a result, when the air bag inflates upward from the position of the pipe 79, the lower portion of the expansion portion of the air bag 78 (not illustrated) overlaps the inner panel 16 by a predetermined length in the vertical direction. Here, the air bag 78 has a shape that extends at length in the longitudinal direction of the vehicle, with a plurality of non-expansion portions (not illustrated) that do not inflate formed in the middle portion of the expansion portion. These non-inflating portions are formed by sewing, adhesion or weaving such as jacquard weaving. Since these non-inflating portions are provided in a plurality in the longitudinal direction of the vehicle, the air bag 78 as a whole deploys in a plate shape.

In the air bag device 11A of the present embodiment, an impact absorption member 83 made of metal (for example, SPA plate material) is provided between the air bag module 76 and the upper lining 52. As shown in FIG. 3, a plurality of joining pieces 85 are provided in the longitudinal direction of the vehicle at the lower end portion (first end portion) of the impact absorption member 83. A mounting hole 84 is formed in each joining piece 85. A bolt 86 that is inserted into the mounting hole 84 of the joining pieces 85 passes through the attachment hole 72 of the inner panel 16 and the attachment hole 72 of the inner reinforcing panel 36 to be screwed into the weld nut 74. The impact absorption member 83 is thereby attached to the inner panel 16.

As shown in FIG. 2 and FIG. 3, the impact absorption member 83 includes a main plate portion (main portion) 88, side plate portions 89, and joining pieces 90. The main plate portion 88 extends from the joining pieces 85 upward between the air bag 78 and the door lining 18, inclining slightly to the cabin interior side toward the upper side at an attitude following the support plate portion 62 of the lining core member 66. The side plate portions 89 are at both sides of the main plate portion 88 in the vehicle longitudinal direction and both sides of the air bag 78 in the vehicle longitudinal direction, and extend in the direction of the inner panel 16. Each joining piece 90 is at the opposite side (upper side) of the joining piece 85 of side plate portion 89, extending outward from the inner panel 16 side. A mounting hole 91 is formed in each joining piece 90. The bolt 86, which is inserted into the mounting hole 91 of each joining piece 90, passes through the attachment hole 72 of the inner panel 16 and the attachment hole 72 of the inner reinforcing panel 36 to be screwed into a weld nut (not illustrated) that is fixed to the cabin exterior side of the inner reinforcing panel 36. Thus the impact absorption member 83 is attached to the inner panel 16 at the side plate portions 89 as well. The impact absorption member 83 is thereby joined to the inner panel 16 at one end below the air bag 78, extends upward between the air bag 78 and the door lining 18, and is joined to the inner panel 16 at both sides of the air bag 78 in the longitudinal direction of the vehicle.

The main plate portion 88, as shown in FIG. 2, includes eight plate portions, namely, a first plate portion 94, a second plate portion 95, a third plate portion 96, a fourth plate portion 97, a fifth plate portion 98, a sixth plate portion 99, a seventh plate portion 100, and an eighth plate portion 101. The first plate portion 94 is positioned closest to the joining pieces 85 and the upper side thereof is sloped so as to be positioned on the cabin interior side. The second plate portion 95 extends slantingly upward at a smaller angle than the first plate portion 94 from the upper edge of the first plate portion 94 so that the upper side thereof is positioned on the cabin interior side. The third plate portion 96 projects slightly to the cabin interior side from the upper edge of the second plate portion 95. The fourth plate portion 97 extends upward from the inside edge of the third plate portion 96 in a manner approximately parallel to the second plate portion 95. The fifth plate portion 98 projects slightly to the cabin exterior side from the upper edge of the fourth plate portion 97. The sixth plate portion 99 extends upward from the outside edge of the fifth plate portion 98 in a manner to form an approximately coplanar surface with the second plate portion 95. The seventh plate portion 100 extends upward in a nearly vertical direction from the upper edge of the sixth plate portion 99. The eight plate portion 101 is the distal end portion (second end portion) of the main plate portion 88, with the upper side thereof sloped so as to be positioned on the cabin interior side from the upper edge of the seventh plate portion 100. The main plate portion 88 makes surface contact with the support plate portion 62 of the upper lining 52 at the second plate portion 95.

The pipe 79 that connects the inflator 77 and the air bag 78 is disposed so as to be positioned lower than the upper end of the impact absorption member 83. Thereby, the expansion portion of the air bag 78, which inflates upward from the position of the pipe 79, overlaps at its lower portion the impact absorption member 83 in the vertical direction by a predetermined length during deployment. That is, the impact absorption member 83, during deployment of the air bag 78, covers the lower portion of the expansion portion from the cabin interior side. Also, a clearance between the impact absorption member 83 and the inner panel 16 is narrower than the expanded thickness of the expansion portion of the air bag 78 in a direction along the clearance. Therefore, during deployment of the air bag 78, the impact absorption member 83 is adapted to press the lower portion of the expansion portion 81 of the air bag 78 against the inner panel 16 side. At this time, the impact absorption member 83 is adapted to be conversely pressed by the expansion portion of the air bag 78. The impact absorption member 83 is set to a strength such that the main plate portion 88 deforms to the cabin interior side by a constant amount in accordance with the expanded thickness of the air bag 78 when thus pressed by the air bag 78. Here, both sides of the impact absorption member 83 in the vehicle longitudinal direction are joined to the inner panel 16 via the side plate portions 89. During deformation of the main plate portion 88, the portion not connected to the side plate portion 89, that is, the central portion in the vehicle longitudinal direction, deforms to a circular arc in a plane view so as to project most to the cabin interior side.

In the air bag device 11A of the present embodiment, when the deployment condition of the air bag device 11A is met during a vehicle collision, such as an inertial force equal to or greater than a predetermined force being detected, the inflator 77 ignites. Then the folded-up air bag 78 inflates by the gas generated by the inflator 77. Since the air bag 78 is folded in a manner to be successively overlapped upward, it deploys so as to extend upward from below the window 19 as shown by the double-dashed line in FIG. 2. At this time, the position of the pipe 79 that connects the inflator 77 and the air bag 78 is lower than the upper end portion of the inner panel 16 and the upper end of the impact absorption member 83. As a result, the air bag 78 deploys by being guided by the impact absorption member 83 on the cabin interior side, and guided by the inner panel 16 on the cabin exterior side. During deployment, the air bag 78 mainly presses the upper plate portion 64 in the upper lining 52. The upper portion of the upper lining 52 that is thus pressed is made to turn, centered on the fragile groove 70, so as to pass over the contact tongue piece 48. Thereafter, the air bag 78 deploys upward along the inner surface of the window glass 17 of the window 19 above. At this time, the clearance between the impact absorption member 83 and the inner panel 16 is narrower than the expanded thickness of the expansion portion of the air bag 78 in the clearance direction. Therefore, during deployment of the air bag 78, the impact absorption member 83 is pressed by the lower portion of the expansion portion, and the main plate portion 88 thereof deforms to the cabin interior side. At this time, the upper lining portion 52 of the door lining 18 is also pressed by the main plate portion 88, and thereby deforms to the cabin interior side.

According to the air bag device 11A of the present embodiment described above, the impact absorption member 83 is interposed between the air bag 78 and the door lining 18. For this reason, when the occupant slams into the door lining 18, the impact can be absorbed by both the lower portion of the expansion portion of the air bag 78 and the impact absorption member 83. Accordingly, greater impact absorption is made possible.

The impact absorption member 83 has a first end portion that is joined to the inner panel 16 below the air bag 78, and has a shape that extends upward between the air bag 78 and the door lining 18. The second end portion on the opposite side of the first end portion is pressed by the air bag 78 during deployment of the air bag 78. In accordance with the expanded thickness of the air bag 78 when thus pressed by the air bag 78, the second end portion side of the main plate portion 88 deforms by a certain amount to the cabin interior side. For this reason, it is possible to ensure a long deformation stroke for impact absorption by the impact absorption member 83 when the occupant slams into the door lining 18. Accordingly, it is possible to more effectively absorb an impact.

Also, the impact absorption member 83 extends upward between the air bag 78 and the door lining 18. For this reason, the air bag 78 can be guided during deployment, and so the deployment direction can be stabilized.

In addition, since the impact absorption member 83 extends upward between the air bag 78 and the door lining 18, the impact applied from the air bag 78 to the door lining 18 during deployment can be reduced.

In addition, the main plate portion 88 of the impact absorption member 83 is joined to the inner panel 16 at the joining pieces 85 below, and the side plate portions 89 of the air bag 78 are joined to the inner panel 16 at the joining pieces 90 on the sides thereof. Thus, since the impact absorption member 83 is supported by the inner panel 16 at a plurality of connection points, when the occupant slams into the door lining 18, the impact can be effectively absorbed. Accordingly, greater impact absorption is made possible. Also, upon securing the impact absorbing performance, it is possible to make thin the thickness of the impact absorption member 83.

Second Embodiment

Next, the air bag device according to the second embodiment of the present invention shall be explained, referring to FIGS. 4 to 10. The explanation shall focus on components differing from the aforementioned first embodiment. Therefore, components similar to those in the first embodiment shall be given the same reference numerals and explanations thereof shall be omitted here.

Figure 4:
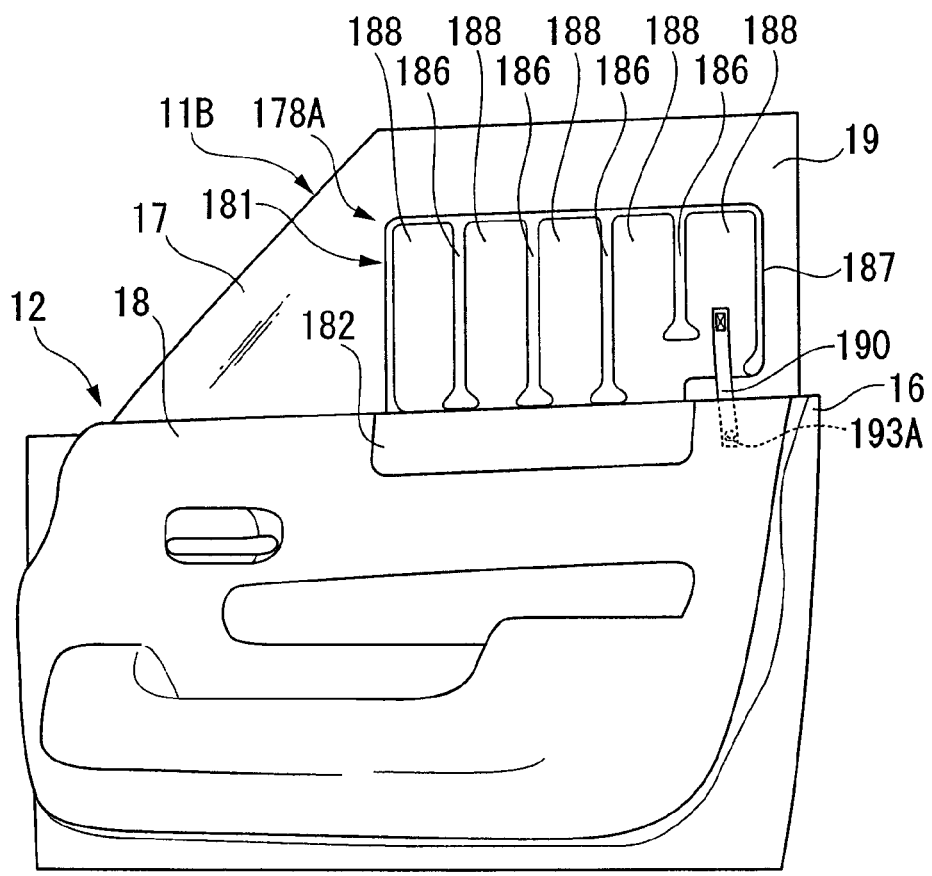
FIG. 4 is a schematic elevation view of the door to which the air bag device according to the second embodiment of the present invention has been applied, seen from the cabin interior side in the state of deployment of the air bag.

An air bag module of an air bag device 11B of the present embodiment includes the inflator 77, and the pipe 79 shown in FIG. 2 or FIG. 3, and additionally an air bag 178A shown in FIG. 4. This air bag module is, as shown in FIG. 4, disposed in a housing portion 182 that forms along the lower border of the window 19. The housing portion 182 is formed by the upper portion of the inner panel 16 (shown in cross section in FIG. 2) and the upper portion of the door lining 18 (shown in cross section in FIG. 2). Also, the impact absorption member 83 (shown in cross section in FIG. 2) is provided similarly to the aforementioned first embodiment, but its illustration is omitted in the present embodiment.

The air bag 178A is, in a contracted state, folded so as to be successively piled upward, and is housed in this state in a housing portion 182. The pipe 79 is fitted to the lower portion of the air bag 178A to couple the inflator 77 and the lower portion of the air bag 178A. Here, the air bag 178A is folded so as to be piled successively upward with respect to the pipe 79, which is the gas supply portion. For this reason, when the air bag deploys by the gas that the inflator 77 generates, it basically deploys upward. At this time, the pipe 79 is positioned lower than the upper end portion of the inner panel 16. For this reason, an expansion portion 181 of the air bag 178A inflates upward from the position of the pipe 79. The lower portion of the expansion portion 181 overlaps the inner panel 16 by a predetermined length in the vertical direction.

Figure 5:
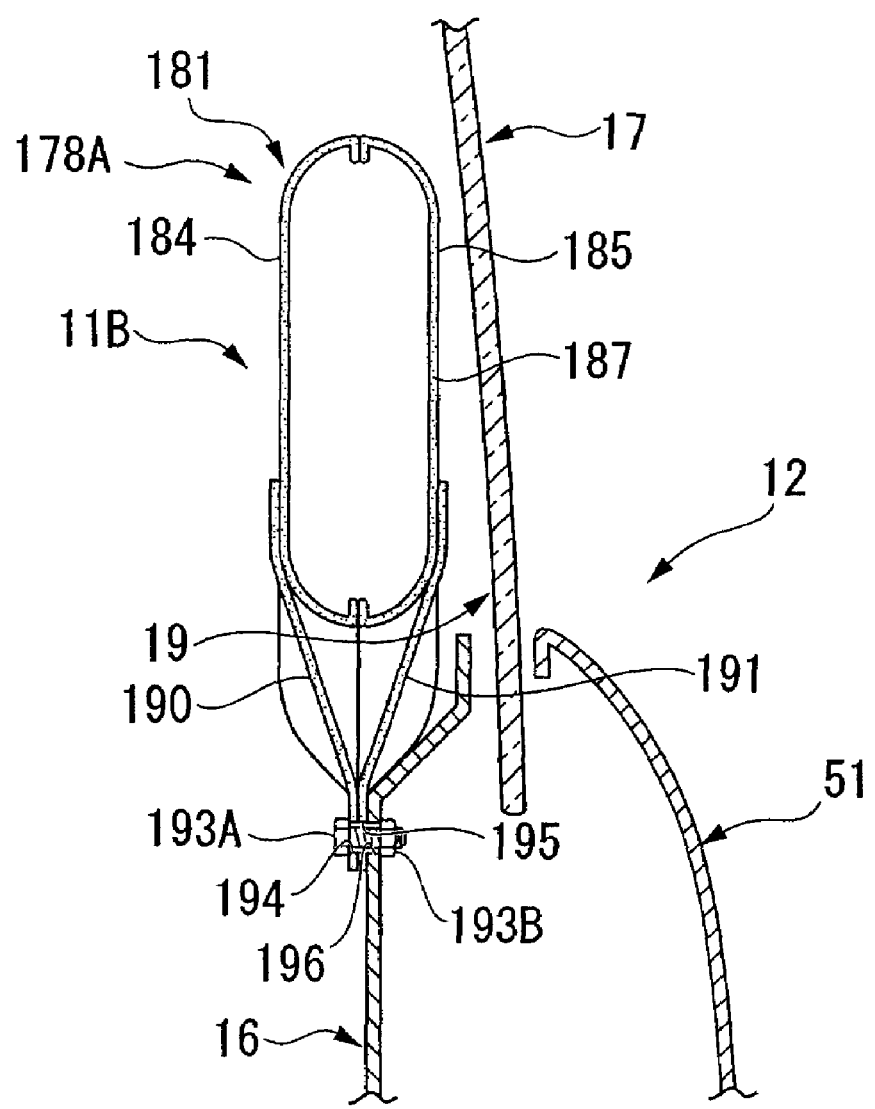
FIG. 5 is a drawing of the upper portion of the door to which the air bag device according to the second embodiment of the present invention has been applied, being a sectional view at the time of deployment of the air bag.

Here, as shown in FIG. 4, the air bag 178A, when deployed, has a shape that extends at length in the vehicle longitudinal direction. As shown in FIG. 5, a base fabric 184 on the cabin interior side and a base fabric 185 on the cabin exterior side are formed into a sack shape by being sewn together at their peripheral edges. As shown in FIG. 4, the air bag 178A includes cells 188 as an expansion portion 181 that inflates during deployment, non-inflating portions 186, and a rear bulge-out portion (side inflation portion) 187. The cells 188 are portions that inflate in a cylindrical shape so as to extend in the vertical direction, with a plurality being provided side-by-side in the vehicle longitudinal direction. The non-inflating portions 186 are portions that do not inflate, and formed by joining of the base fabrics 184 and 185 by sewing, adhesion or weaving such as jacquard weaving. Since these non-inflating portions 186 are formed at positions between the cells 188, the air bag 178A as a whole inflates in a plate shape. The rear bulge-out portion 187 is provided at a rear portion of the expansion portion 181. The rear bulge-out portion 187 is a portion that swells out to the rear from a range extending from the middle portion to the upper portion in the vertical direction of the expansion portion 181. The rear bulge-out portion 187 overhangs rearward with respect to the housing portion 182.

The air bag device 11B of the present embodiment, as shown in FIG. 4 or FIG. 5 has a strap (coupling member) 190 and a strap (coupling member) 191. The strap 190 is a member that couples a predetermined region of the inner panel 16 and a predetermined region of the cabin interior side of the rear bulge-out portion 187 of the air bag 178A. The predetermined region of the inner panel 16 refers to a region of the inner panel 16 lower than the window 19 and near the housing portion 182. Also, the predetermined region of the cabin interior side of the rear bulge-out portion 187 refers to a region of the air bag 178A within a range extending from the middle portion to the upper portion in the vertical direction during deployment of the air bag 178A. This strap 190 can couple the predetermined region of the air bag 178A within the range extending from the middle portion to the upper portion thereof in the vertical direction and the inner panel 16, while overlapping the cabin interior side during deployment of the air bag 178A. Also, the strap 191 is a member that couples a predetermined region of the inner panel 16 and a predetermined region of the cabin exterior side of the rear bulge-out portion 187. This strap 191 can couple the predetermined region of the air bag 178A within the range extending from the middle portion to the upper portion thereof in the vertical direction and the inner panel 16, while overlapping the cabin exterior side during deployment of the air bag 178A.

The strap 190 is, for example, made of cloth, with its upper end portion fixed by cloth to the predetermined region on the cabin interior side of the rear bulge-out portion 187, and the lower end portion attached to the inner panel 16. A mounting hole 194 is formed in the lower end portion of the strap 190. Also, the strap 190 is, for example, made of cloth, with its upper end portion fixed by cloth to the predetermined region on the cabin exterior side of the rear bulge-out portion 187, and the lower end portion fixed by being attached to the strap 190 and the inner panel 16. A mounting hole 196 is formed in the lower end portion of the strap 191. That is, a bolt 193A is passed through the mounting hole 194 of the strap 190, the mounting hole 195 of the strap 191, and the mounting hole 196 of the inner panel 16, and screwed into a weld nut 193B fixed to the cabin exterior side of the inner panel 16. Thus, the straps 190 and 191 are fixedly fastened to the inner panel 16. The straps 190 and 191 are folded together with the air bag 178A and housed in the housing portion 182.

Figure 6:
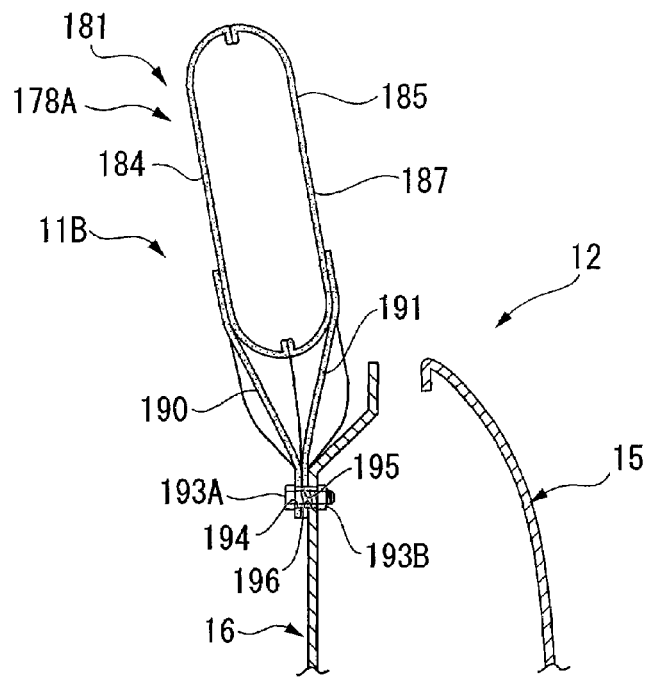
FIG. 6 is a drawing of the upper portion of the door to which the air bag device according to the second embodiment of the present invention has been applied, being a sectional view showing the state of the air bag during deployment being inclined to the cabin interior side by the strap.
Figure 7:
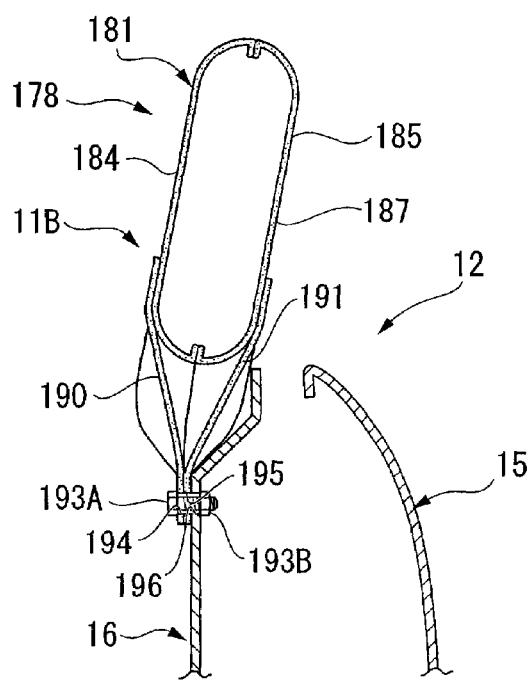
FIG. 7 is a drawing of the upper portion of the door to which the air bag device according to the second embodiment of the present invention has been applied, being a sectional view showing the state of the air bag during deployment being inclined to the cabin exterior side by the strap.

In the air bag device 11B of the present embodiment, when the deployment condition of the air bag device 11B is met during a vehicle collision, such as an inertial force equal to or greater than a predetermined force being detected, the inflator ignites. Then the folded-up air bag 178A inflates by the gas generated by the inflator. Since the air bag 178A is folded in a manner to be successively overlapped upward, it deploys so as to extend upward from below the window 19 as shown by the double-dashed line in FIG. 2. During deployment, the air bag 178A mainly presses the upper plate portion 64 in the upper lining 52. The upper portion of the upper lining 52 that is thus pressed is made to turn, centered on the fragile groove 70, so as to pass over the contact tongue piece 48. Thereafter, the air bag 178A deploys upward along the inner surface of the window glass 17 of the window 19 above. At this time, the rear bulge-out portion 187 is swelled out to the rear. Particularly at the end of deployment, as shown in FIG. 5, the tensioning of the cabin interior side strap 190 and the cabin exterior side strap 191 stabilizes the attitude of the air bag 178A in the cabin interior/exterior direction (vehicle width direction). For that reason, the spacing between the air bag 178A and the widow glass 17 can be stabilized. In this case, by adjusting the length of the straps 190 and 191, the attitude of the air bag 178A can be decided. Thereby, the air bag can made to stand vertically as shown in FIG. 5, inclined to the cabin interior side as shown in FIG. 6, or inclined to the cabin exterior side as shown in FIG. 7.

As stated above, according to the air bag device 11B of the present embodiment, the strap 190 couples the inner panel 16 under the window 19 and a predetermined region on the cabin interior side of the rear bulge-out portion 187 within a range extending from the middle portion to the upper portion in the vertical direction during deployment of the air bag 178A, and the strap 191 couples the inner panel 16 under the window 19 and a predetermined region on the cabin exterior side of the rear bulge-out portion 187 within a range extending from the middle portion to the upper portion in the vertical direction during deployment of the air bag 178A. For this reason, when the air bag 178A deploys, the tensioning of the straps 190 and 191 can control the attitude of the air bag 178A in the cabin interior/exterior direction, that is, in the approaching/separating direction with respect to the window 19, when deployed.

Figure 8:
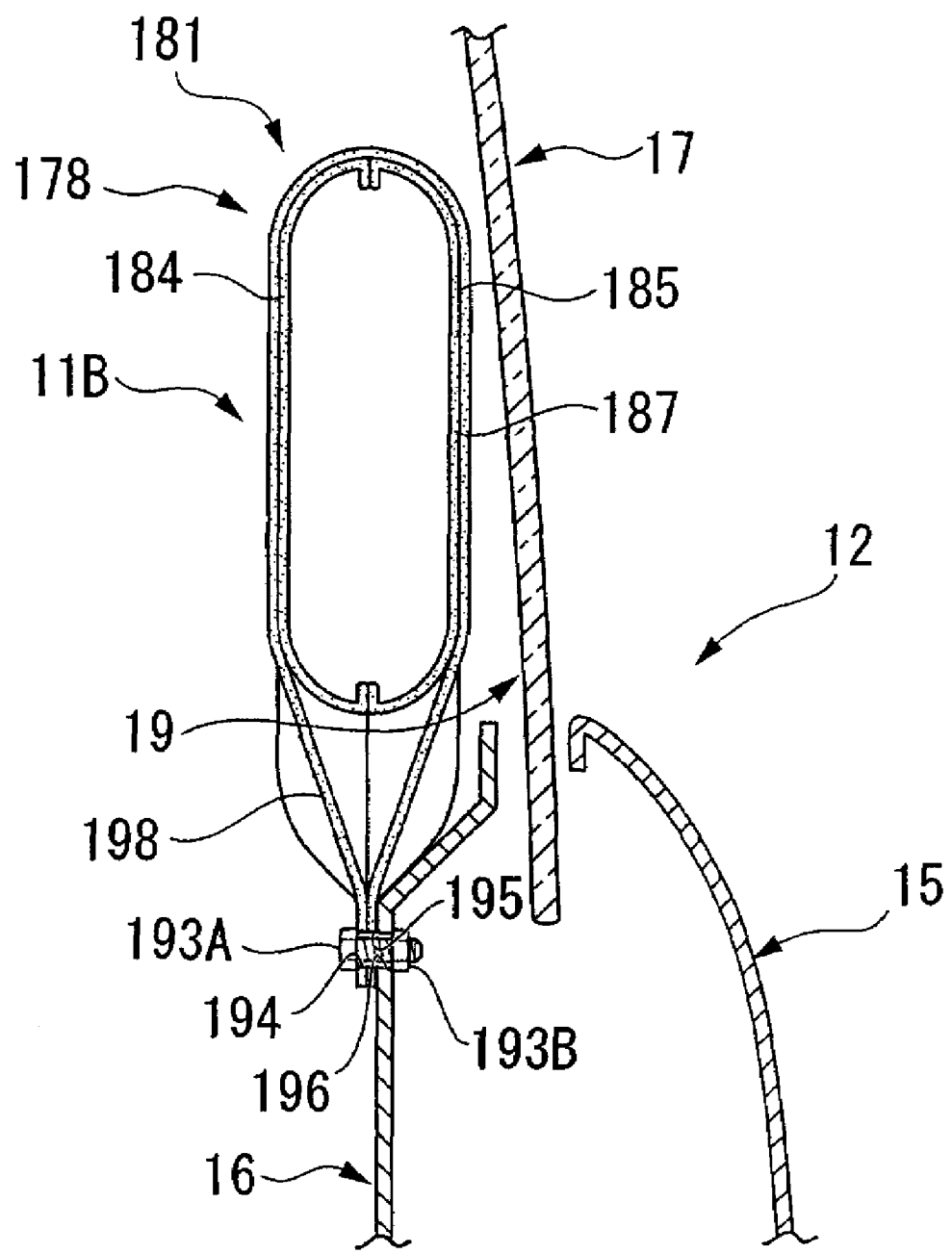
FIG. 8 is a drawing of the upper portion of the door to which a modification example of the air bag device according to the second embodiment of the present invention has been applied, being a sectional view at the time of deployment of the air bag.

The present embodiment was explained using as an example the case of providing separate straps 190 and 191 on the cabin interior side and the cabin exterior side of the rear bulge-out portion 187 of the air bag 178A. However, the present invention is not limited thereto. For example, as shown in FIG. 8, these straps may be replaced with a single strap 198. That is, with respect to the air bag 178A, the strap 198 may straddle the top edge of the rear bulge-out portion 187 during deployment to be passed over the cabin interior portion and the cabin exterior portion thereof. At least one location of the strap 198 is fixed to the air bag 178A, and both end portions are fixed to the inner panel 16 below the window 19. In this way, the air bag 178A including the strap 198 can be readily formed.

Also, in the present embodiment, the strap 190 is attached so as to overlap the cabin interior side of the rear bulge-out portion 187 and the strap 191 is attached so as to overlap the cabin exterior side of the rear bulge-out portion 187. Thus the present embodiment was explained using as an example the case of attaching the straps 190 and 191 to the inner panel 16 below the window 19. However, the present invention is not limited thereto. A strap may be provided that connects a predetermined region of the air bag 178A within a range extending from the middle portion to the upper portion in the vertical direction and the door 12 lower than the window 19 during deployment of the air bag 178A, while overlapping at least one of the cabin interior side portion or the cabin exterior side portion during deployment of the air bag 178A. That is, in order to control the attitude of the air bag 178A in the cabin interior/exterior direction, the strap may be attached overlapping at least one of the cabin interior side portion and the cabin exterior side portion of the air bag 178A, or even if attached to the top edge or the side edge, the extending portion is overlapped on at least one of the cabin interior side portion and the cabin exterior side portion of the air bag 178A. In other words, the case of the strap being attached to the lower end of the air bag 178A and extending without overlapping either of the cabin interior side portion and the cabin exterior side portion of the air bag 178A would not be suitable for controlling the attitude of the air bag 178A in the cabin interior/exterior direction. Also, the case of the strap being attached to the side edge and extending without overlapping the cabin interior side portion and the cabin exterior side portion of the air bag 178A would not be suitable for controlling the attitude of the air bag 178A in the cabin interior/exterior direction As long as the aforementioned conditions are met, various modifications to the air bag device are possible. For example, modifications such as the following are possible.

Figure 9:
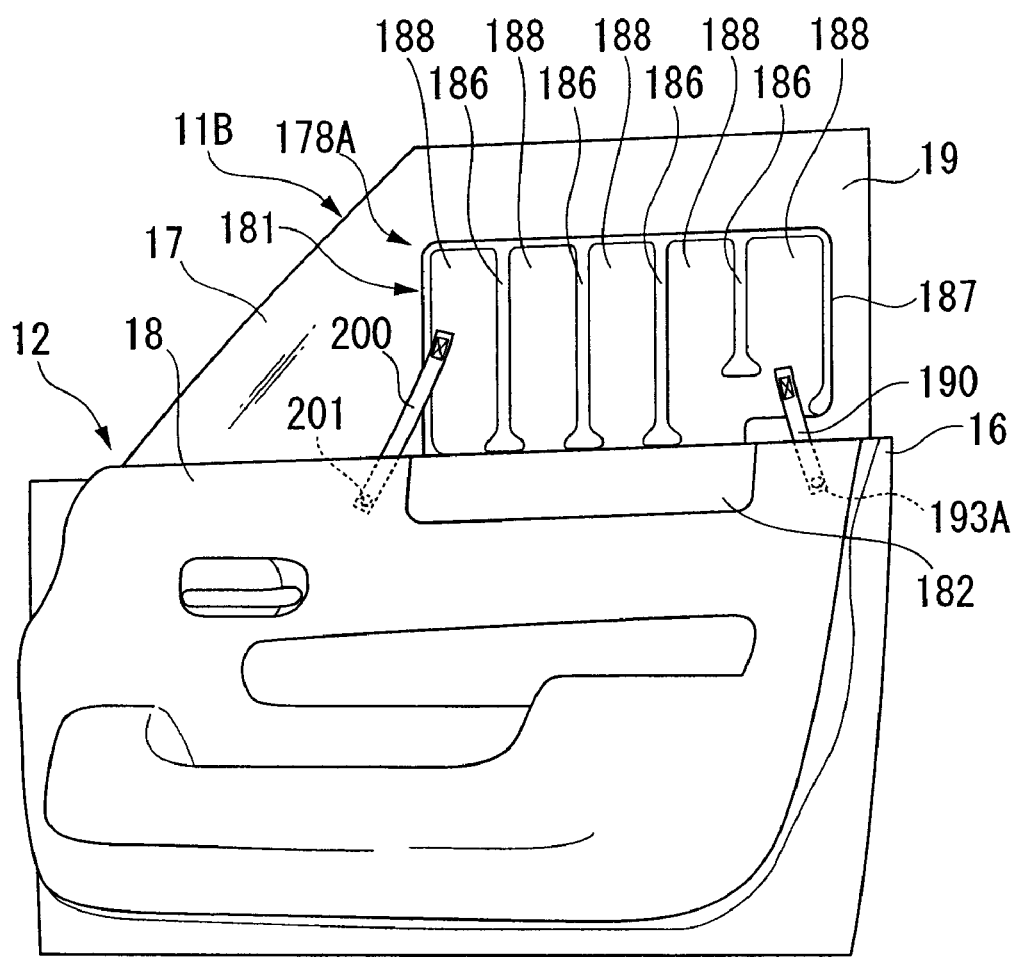
FIG. 9 is a drawing of the door to which another modification example of the air bag device according to the second embodiment of the present invention has been applied, being a schematic elevation view from the cabin interior side in the state of deployment of the air bag.

FIG. 9 shows another modification example of the air bag device according to the second embodiment of the present invention. FIG. 9 shows an example of providing a strap 200 that couples the air bag 78 and the door 12 lower than the window 19 on the cabin interior side portion and the cabin exterior side portion of the front portion of the air bag 178A (FIG. 9 showing only the cabin interior side portion), in addition to the rear bulge-out portion 187 of the air bag 178A. A first end portion of the strap 200 is joined to the air bag 78 by being sewn and a second end thereof is joined, by a bolt 201, to the inner panel 16. In this case as well, single strap may be used in place of separate inner and outer straps 200. That is, a single strap may straddle the top edge of the front of the air bag 78 to pass over the cabin interior side portion and the cabin exterior side portion.

Figure 10:
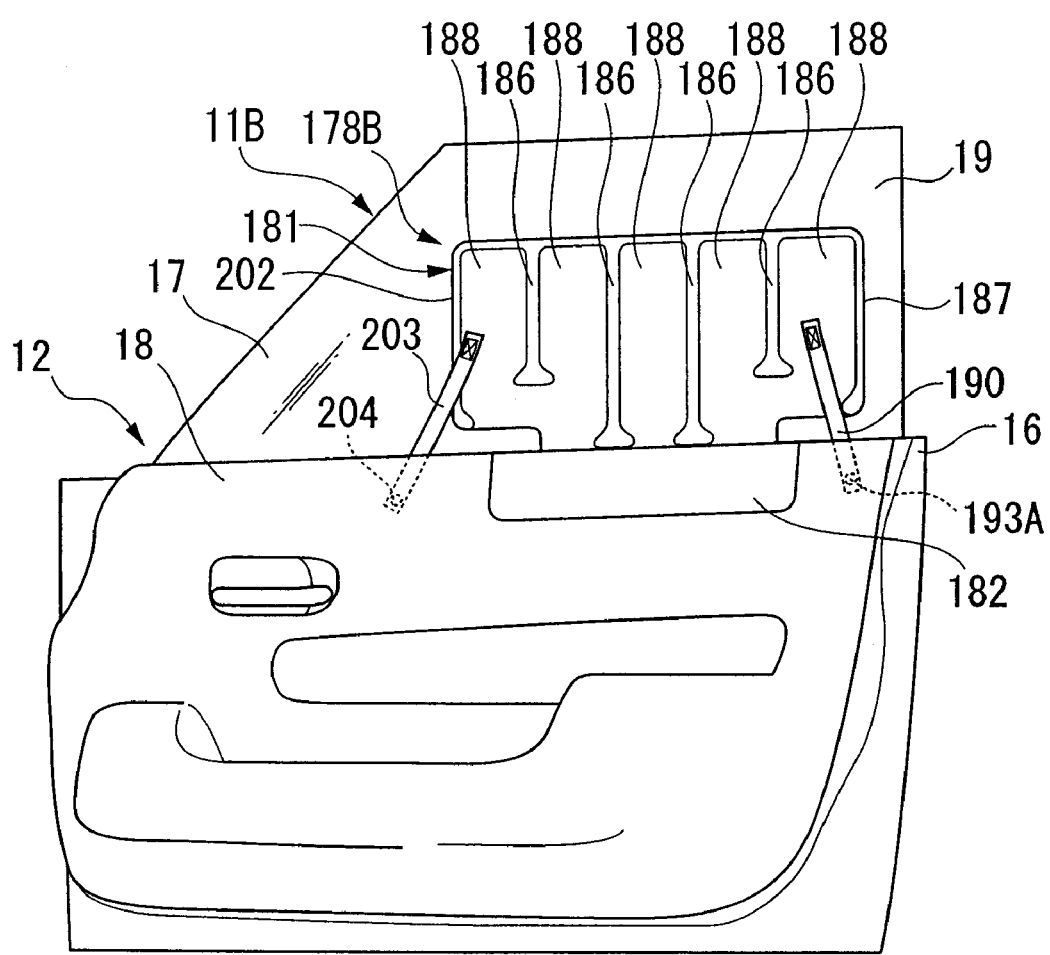
FIG. 10 is a drawing of the door to which still another modification example of the air bag device according to the second embodiment of the present invention has been applied, being a schematic elevation view from the cabin interior side in the state of deployment of the air bag.

Also, FIG. 10 shows yet another modification example of the air bag device according to the second modification example of the present invention. An air bag 178B of FIG. 10 is shown having a front bulge-out portion (side inflation portion) 202 that swells to the front in addition to the rear bulge-out portion 187 of the aforementioned air bag 178A. In this case, a strap 203 that couples the air bag 178B and a portion of the door 12 lower than the window 19 is provided on a cabin interior side portion and a cabin exterior side portion of the front bulge-out portion 202 (FIG. 10 shows only the cabin interior side portion), in addition to the rear bulge-out portion 187. A first end portion of the strap 203 is joined to the air bag 178B by being sewn and a second end thereof is joined to by a bolt 204 to the inner panel 16. In this case as well, a single strap may be used in place of separate inner and outer straps 203. That is, a single strap passes over the cabin interior side portion and the cabin exterior side portion so as to straddle the top edge of the front bulge-out portion 202 of the air bag 178B.

In addition, in any of the above, it is possible to provide only a strap on the cabin exterior side portion or provide only a strap on the cabin interior side portion. For example, in the case of the air bag 178A and the air bag 178B naturally being inclined to the cabin interior side during deployment due to their respective shapes, it is possible to inhibit the inclination by providing a strap on the cabin exterior side portion. Conversely, in the case of naturally inclining to the cabin exterior side during deployment, it is possible to inhibit the inclination by providing a strap on the cabin interior side portion.

Third Embodiment

Next, the air bag device according to the third embodiment of the present invention shall be explained, referring to FIGS. 11 to 14. The explanation shall focus on components differing from the aforementioned first embodiment. Therefore, components similar to those in the first embodiment shall be given the same reference numerals and explanations thereof shall be omitted here.

Figure 11:
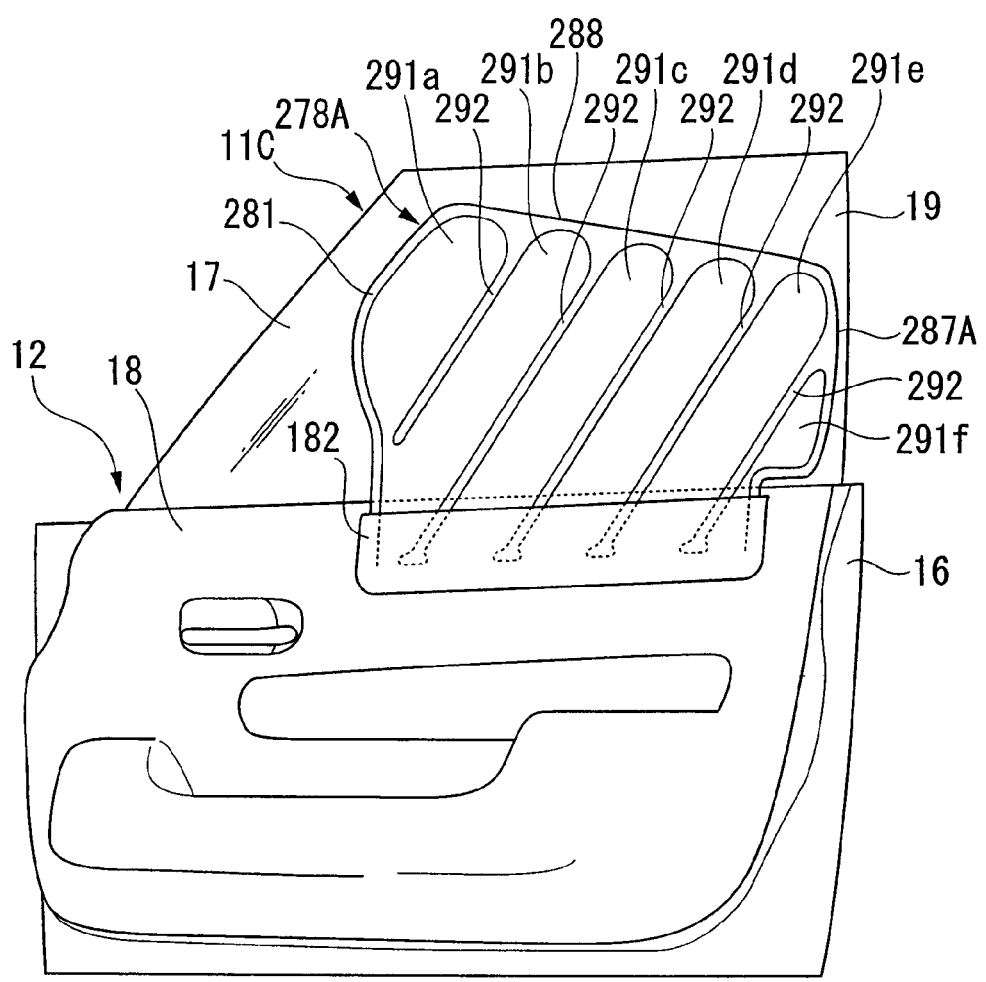
FIG. 11 is a drawing of the door to which the air bag device according to the third embodiment of the present invention has been applied, being a schematic elevation view from the cabin interior side in the state of deployment of the air bag.

An air bag module of an air bag device 11C of the present embodiment includes the inflator 77, and the pipe 79 shown in FIG. 2 or FIG. 3, and additionally an air bag 278A shown in FIG. 11. This air bag module is, as shown in FIG. 11, disposed in a housing portion 182 that forms along the lower border of the window 19. Also, the impact absorption member 83 (shown in cross section in FIG. 2) is provided similarly to the aforementioned first embodiment, but its illustration is omitted in the present embodiment.

The air bag 278A is, in a contracted state, folded so as to be successively piled upward, and is housed in this state in a housing portion 182. The pipe 79 is fitted to the lower portion of the air bag 278A to couple the inflator 77 and the lower portion of the air bag 278A. Here, the air bag 278A is folded so as to be piled successively upward with respect to the pipe 79, which is the gas supply portion. For this reason, when the air bag deploys by the gas that the inflator 77 generates, it basically deploys upward. At this time, the pipe 79 is positioned lower than the upper end portion of the inner panel 16. For this reason, an expansion portion 281 of the air bag 278A inflates upward from the position of the pipe 79. The lower portion of the expansion portion 281 overlaps the inner panel 16 by a predetermined length in the vertical direction.

Figure 12:
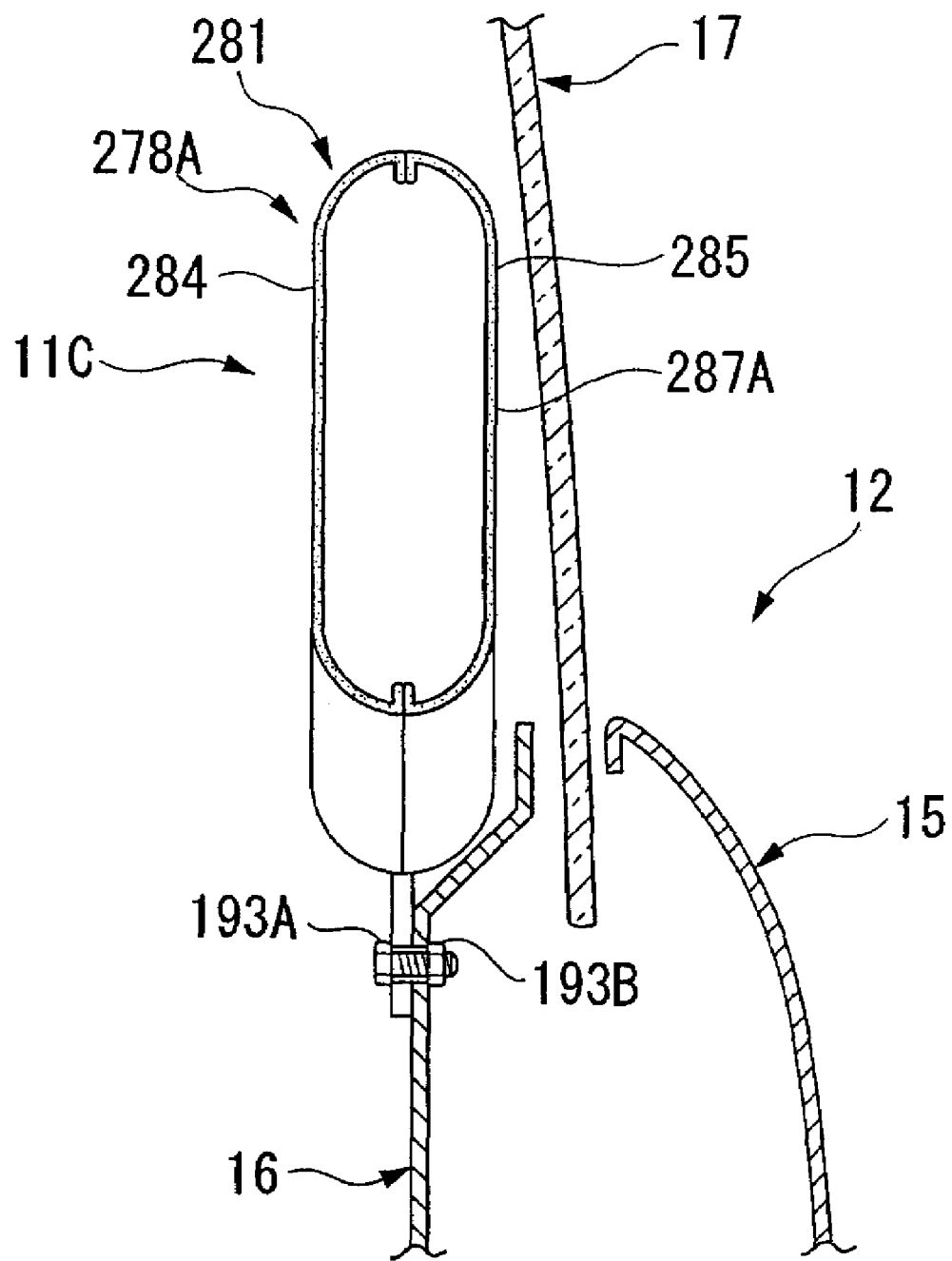
FIG. 12 is a drawing of the upper portion of the door to which the air bag device according to the third embodiment of the present invention has been applied, being a sectional view at the time of deployment of the air bag.

Here, as shown in FIG. 11, the air bag 278A, when deployed, has a shape that extends at length in the vehicle longitudinal direction. As shown in FIG. 12, a base fabric 284 on the cabin interior side and a base fabric 285 on the cabin exterior side are formed into a sack shape by being sewn together at their peripheral edges. Also, a rear bulge-out portion (side inflation portion) 287A is provided at the rear portion of the air bag 278A. The rear bulge-out portion 287A is a portion that projects from the housing portion 182 when the air bag 278A deploys. That is, it swells out to the rear from a range of the expansion portion 281 extending from the middle portion to the upper portion in the vertical direction. The rear bulge-out portion 287A overhangs rearward with respect to the housing portion 182. The portion of the air bag 278A other than the rear bulge-out portion 287A is called a main deployment portion 288. That is, the main deployment portion 288 is the portion within the range above the housing portion 182 in the vehicle longitudinal direction during deployment.

The air bag 278A includes cells 291a to 291f serving as an expansion portion 281 that inflates during deployment and non-inflating portions 292 that do not inflate. These cells 291a to 291f are portions that inflate in a cylindrical shape so as to extend nearly in the vertical direction, with a plurality being provided side-by-side in the lateral direction, specifically in the vehicle longitudinal direction. The non-inflating portions 292 are portions that do not inflate, and formed by joining of the base fabrics 284 and 285 by sewing, adhesion or weaving such as jacquard weaving. Since these non-inflating portions 292 are formed at positions between adjacent portions of the cells 291a to 291f, the air bag 78 as a whole inflates in a plate shape.

Figure 13:
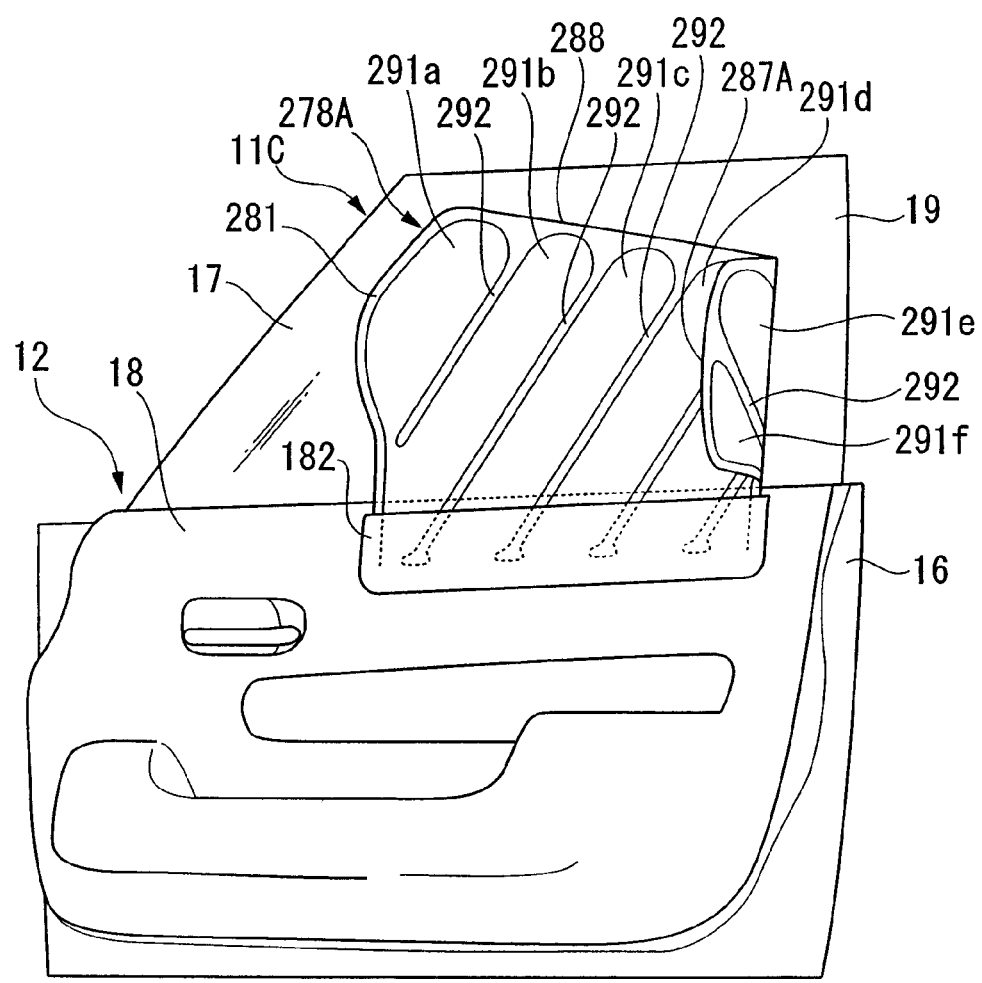
FIG. 13 is a drawing of the door to which the air bag device according to the third embodiment of the present invention has been applied, being a schematic elevation view from the cabin interior side of the folded state of the rear inflation portion.

Here, the cells 291b to 291e in the middle are disposed so that all of the lower portions thereof overlap the inner panel 16 by a predetermined length in the vertical direction. Also, among the cells 291b to 291e in the middle, the lower portion of the rearmost cell 291e is within the main deployment portion 288 and overlaps the inner panel 16 by a predetermined length in the vertical direction. The upper portion of this cell 291e inclines upward to the rear so as to be positioned within the rear bulge-out portion 287A. The other cells 291b to 291d in the middle also incline so as to be parallel to the cell 291e. Also, the cell 291a of the front end is disposed on the upper front side of the cell 291b immediately to the rear thereof. The rear end cell 291f is disposed on the lower rear side of the cell 291e immediately to the front thereof, at a portion within the rear bulge-out portion 287A. As shown in FIG. 13, when the air bag 278A is folded, the rear bulge-out portion 287A is folded back so as to be stacked on the cabin interior side of the main deployment portion 288, which is within the range of the housing portion 182. In this state, as shown in FIG. 2, the air bag is folded so as to be successively piled upward with respect to the pipe 79.

In the air bag device 11C of the present embodiment, when the deployment condition of the air bag device 11C is met during a vehicle collision, such as an inertial force equal to or greater than a predetermined force being detected, the inflator ignites. Then the cells 291a to 291f of the folded-up air bag 278A inflate in a cylindrical shape by the gas generated by the inflator. Since the air bag 278A is folded in a manner to be successively overlapped upward, it deploys so as to extend upward. At this time, the pipe 79 that connects the inflator and the air bag 278A is disposed so as to be positioned lower than the upper end portion of the inner panel 16. For this reason, the air bag 278A deploys being guided by the inner panel 16. During deployment, the air bag 278A mainly presses the upper plate portion 64 in the upper lining 52 shown in FIG. 2. The upper portion of the upper lining 52 that is thus pressed is made to turn, centered on the fragile groove 70, so as to pass over the contact tongue piece 48. Thereafter, the air bag 278A deploys upward along the inner surface of the window glass 17 of the window 19 above. At this time, the rear bulge-out portion 287A is swelled out to the rear.

As stated above, according to the air bag device 11C of the present embodiment, the plurality of cells 291a to 291f of the air bag 278A are provided side-by-side in the lateral direction. For this reason, when the air bag 278A deploys, each of the cells 291a to 291f can deploy well in the vertical direction. Also, among the cells 291a to 291f, the lower portions of the cells 291b to 291e positioned in the middle overlap the panel 16 by a predetermined length in the vertical direction. For this reason, the cells 291a to 291f, being guided by the inner panel 16, deploy well in the upward direction. In this way, the deploying direction of the air bag can be stabilized.

Figure 14:
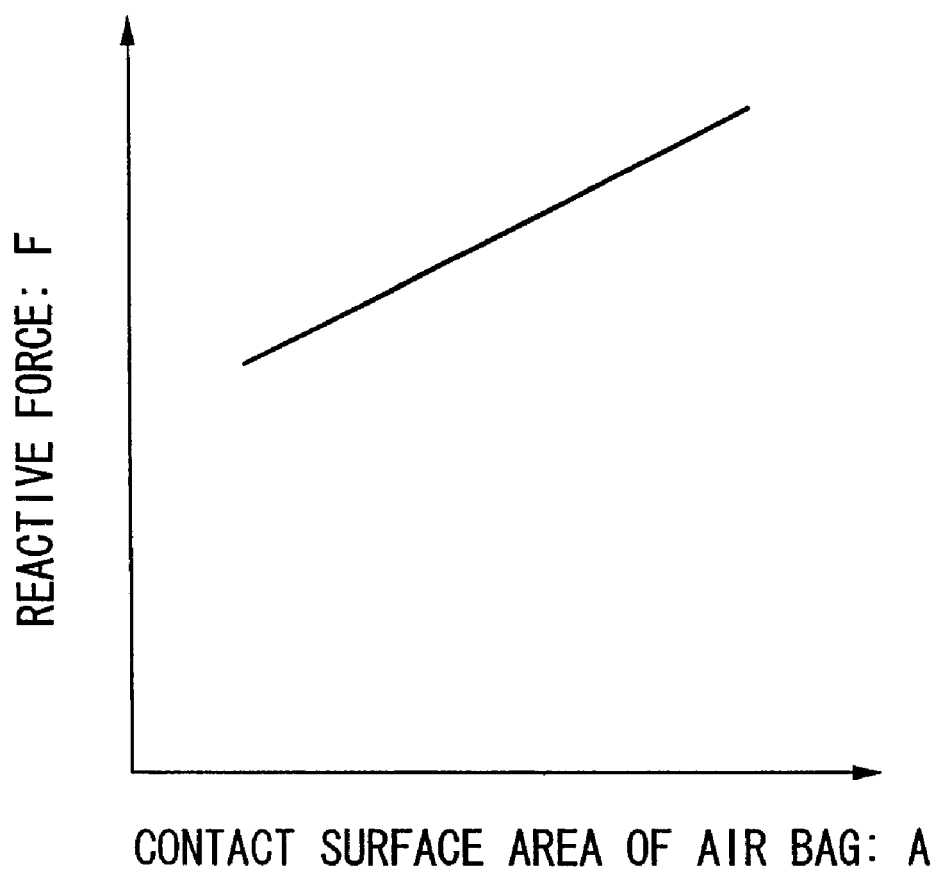
FIG. 14 is a graph showing the relationship between the contact surface area of the air bag with the inner panel and the reactive force of the air bag.

Moreover, the lower portion of the plurality of cells 291b to 291e provided side-by-side in the lateral direction can be brought into contact with the inner panel 16. As a result, it is possible to secure the contact surface area between the air bag 278A and the panel 16, and so when the occupant makes contact with the air bag 278A from the cabin interior side, a reactive force therewith can be secured. Thereby, the performance as the air bag 278A improves. That is, as shown in FIG. 14, a proportional relationship between the contact surface area A of the air bag 278A with the inner panel 16 and the reactive force F (the force toward the cabin interior side that stops the occupant) when the occupant makes contact with the air bag 278A, in that the greater then contact surface area, the greater the reactive force is. For this reason, an increase in the contact surface area can increase the reactive force when the occupant comes into contact with the air bag 278A.

In addition, each lower portion of the plurality of cells 291b to 291e provided side-by-side in the lateral direction is supported by the inner panel 16. For this reason, when the occupant makes contact with the air bag 278 from the cabin interior side, the portion of the air bag 278A above the inner panel 16 is hindered from falling over. As a result, the reactive force when the occupant makes contact with the air bag 78 from the cabin interior side can be reliably secured. Thereby, the performance as the air bag 278A improves.

Also, the air bag 278A has a rear bulge-out portion 287A that swells out in the lateral direction from a portion above the housing portion 182. Then, the lower portion of the one cell 291e overlaps the inner cell 16 by a predetermined length in the vertical direction, and the upper portion of this cell 291e inclines so as to be positioned within the rear bulge-out portion 287A. For this reason, when the occupant comes into contact with the air bag 278A from the cabin interior side even at the rear bulge-out portion 287A, it is hindered from falling over. As a result, the reactive force when the occupant makes contact with the air bag 278A from the cabin interior side can be reliably secured. Thereby, the performance as the air bag 278A improves.

Moreover, the lower portion of the cell 291e, which is the gas supply side, is disposed on the inflator side, overlapping the inner panel 16 by a predetermined length in the vertical direction. And the upper portion of the cell 291e inclines so as to be positioned within the rear bulge-out portion 287A. For this reason, the rear bulge-out portion 287A, which is folded to the housing portion 182 side (the main deployment portion 288 side) when housed in the housing portion 182, can be made to deploy quickly during deployment.

Fourth Embodiment

Figure 15:
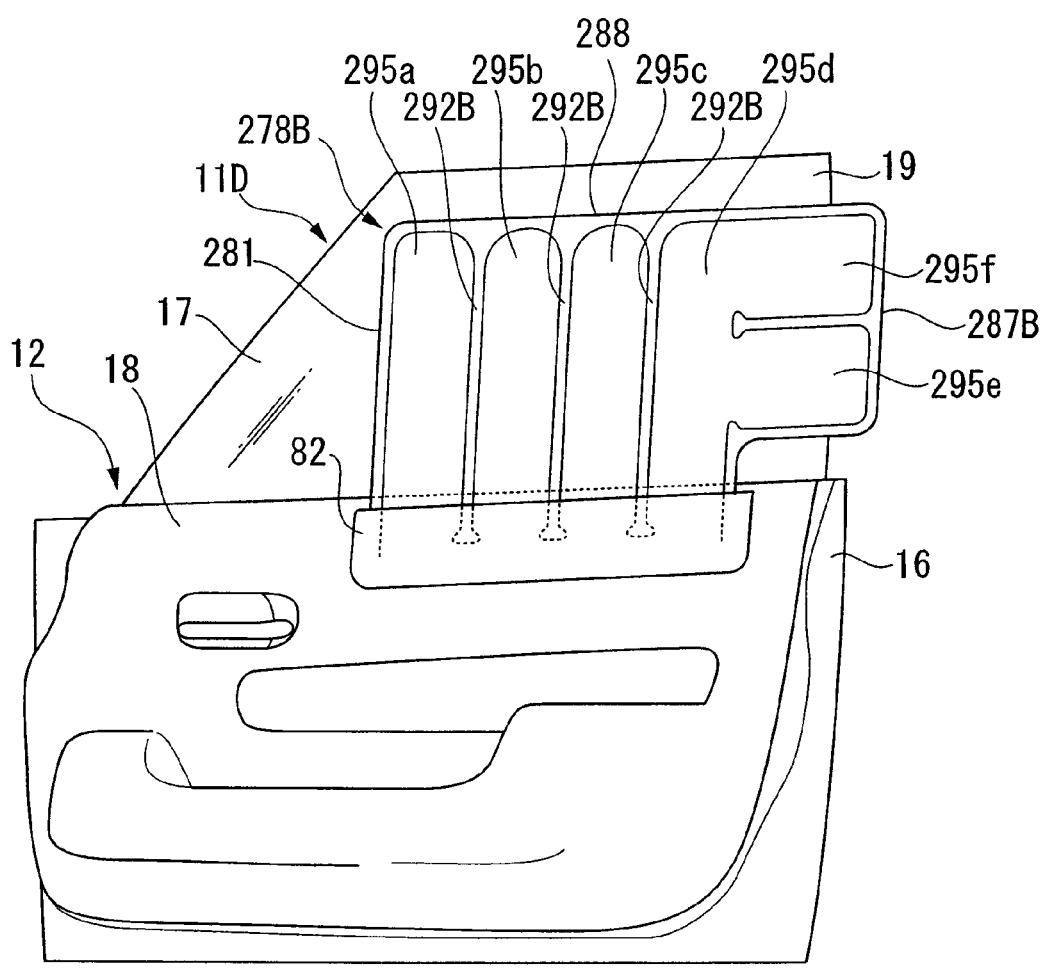
FIG. 15 is a drawing of the door to which the air bag device according to the fourth embodiment of the present invention has been applied, being a schematic elevation view from the cabin interior side in the state of deployment of the air bag.

Next, the air bag device according to the fourth embodiment of the present invention shall be explained, referring to FIG. 15. The explanation shall focus on components differing from the aforementioned third embodiment. Therefore, components similar to those in the third embodiment shall be given the same reference numerals and explanations thereof shall be omitted here.

An air bag module of an air bag device 11D according to the fourth embodiment includes the inflator 77, and the pipe 79 shown in FIG. 2 or FIG. 3, and additionally an air bag 278B shown in FIG. 15. That is, the difference with the air bag device 11C in the aforementioned third embodiment is the air bag 278B.

In the present embodiment, the air bag 278B has different non-inflating portions from the aforementioned third embodiment. The non-inflating portions are shown by the reference numeral 292B. That is, the cells 295a to 295d that inflate in a cylindrical shape so as to extend linearly in the vertical direction are provided side-by-side in the vehicle longitudinal direction. These cells 295a to 295d extend along the vertical direction. Among these cells 295a to 295d, at the most rearward side of the cell 295d on the rear bulge-out portion (side inflation portion) 287B, cell 295e and 295f are formed having their inner portions continuous with the cell 295d. These cells 295e and 295f are formed so as to extend rearward from the middle portion and upper portion, respectively, in the vertical direction of the cell 295d, that is, within the rear bulge-out portion 287B.

Here, the cells 295a to 295d within the main deployment portion 288 are disposed so that all of the lower portions thereof overlap the inner panel 16 by a predetermined length in the vertical direction. In the fourth embodiment, when the air bag 278B is folded, the rear bulge-out portion 287B is folded back so as to be stacked on the cabin interior side of the main deployment portion 288, which is within the range of the housing portion 182. In this state, the air bag is folded so as to be successively piled upward with respect to the pipe 79.

In the air bag device 11D of the present embodiment, when the inflator ignites, each of the cells 295a to 295f of the folded air bag 278B inflates in a cylindrical shape by the gas generated by the inflator. Then, since the air bag 278B is folded in a manner to be successively overlapped upward, it deploys so as to extend upward. At this time, similarly to the aforementioned third embodiment, the pipe 79 that connects the inflator and the air bag 278B is disposed so as to be positioned lower than the upper end portion of the inner panel 16 (not illustrated in FIG. 15). For this reason, the air bag 278B deploys being guided by the inner panel 16. During deployment, the air bag 278B mainly presses the upper plate portion 64 of the upper lining 52. The upper portion of the upper lining 52 that is thus pressed is made to turn, centered on the fragile groove 70, so as to pass over the contact tongue piece 48. Thereafter, the air bag 278B deploys upward along the inner surface of the window glass 17 of the window 19 above. At this time, the rear bulge-out portion 287B is swelled out to the rear.

According to the air bag device 11D of the present embodiment, the plurality of cells 295a to 295d of the air bag 278B are provided side-by-side in the lateral direction. For this reason, when the air bag 278B deploys, each of the cells 295a to 295d deploy well in the vertical direction. Also, the lower portions of the cells 295a to 295d overlap the panel 16 by a predetermined length in the vertical direction. For this reason, the cells 295a to 295d, being guided by the inner panel 16, deploy well in the upward direction. In this way, the deploying direction of the air bag 278B can be stabilized.

Moreover, the lower portions of the plurality of cells 295a to 295d provided side-by-side in the lateral direction can be supported by the inner panel 16. As a result, it is possible to secure the reactive force that acts when the occupant makes contact with the air bag 278B from the cabin interior side. Thereby, the performance as an air bag 278B improves.

In addition, each lower portion of the plurality of cells 295a to 295d provided side-by-side in the lateral direction is supported by the inner panel 16. For this reason, when the occupant makes contact with the air bag 278B from the cabin interior side, the portion of the air bag 278B above the inner panel 16 is hindered from falling over. As a result, the reactive force when the occupant makes contact with the air bag 278B from the cabin interior side can be reliably secured. Thereby, the performance as an air bag 278B improves.

Also, the air bag 278B has a rear bulge-out portion 287B that swells out in the lateral direction from a portion of the air bag above the housing portion 182. The lower portion of the cell 295d, which is the gas supply side, is disposed on the inflator side, overlapping the inner panel 16 by a predetermined length in the vertical direction. Moreover, the upper portion of this cell 295d is continuous with the cells 295e and 295f that extend rearward. For this reason, the rear bulge-out portion 287, which is folded to the main deployment portion 288 side when housed in the housing portion 182, can be made to deploy quickly during deployment.

Explanations were given in the aforementioned embodiments using as examples the air bag devices 11A to 11D provided in the door 12 of the vehicle. However, the present invention is not limited thereto. It may be applied as long as it is disposed below a window and deploys an air bag along the inside surface of a window. For example, it may be applied to an air bag device that is provided below a rear side window in a coupe-type vehicle or applied to an air bag device that is provided below a tailgate window.

Figure 16:
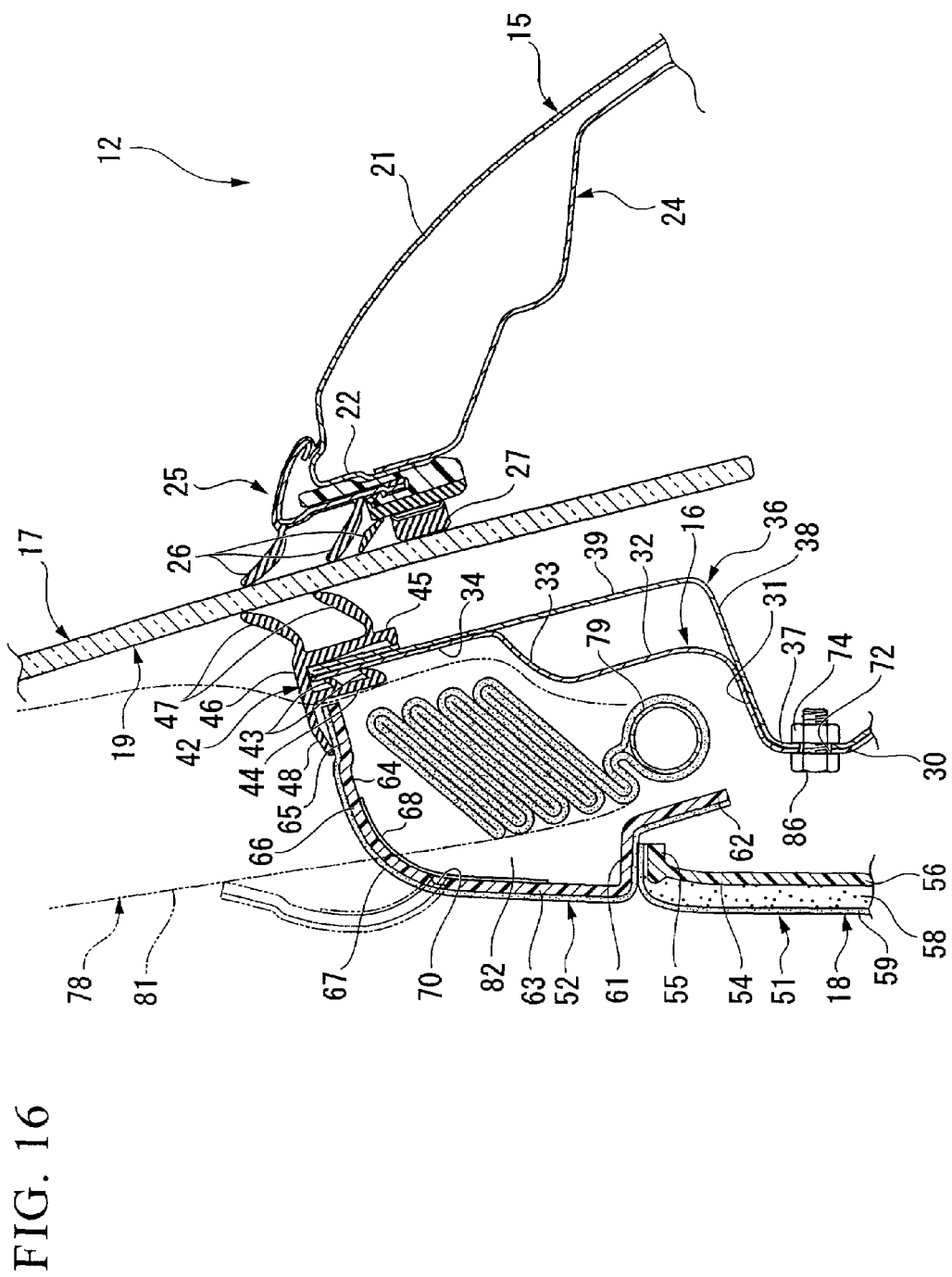
FIG. 16 is a section view schematically showing the upper portion of the door to which the air bag device according to the second through fourth embodiments of the present invention has been applied.
Figure 17:
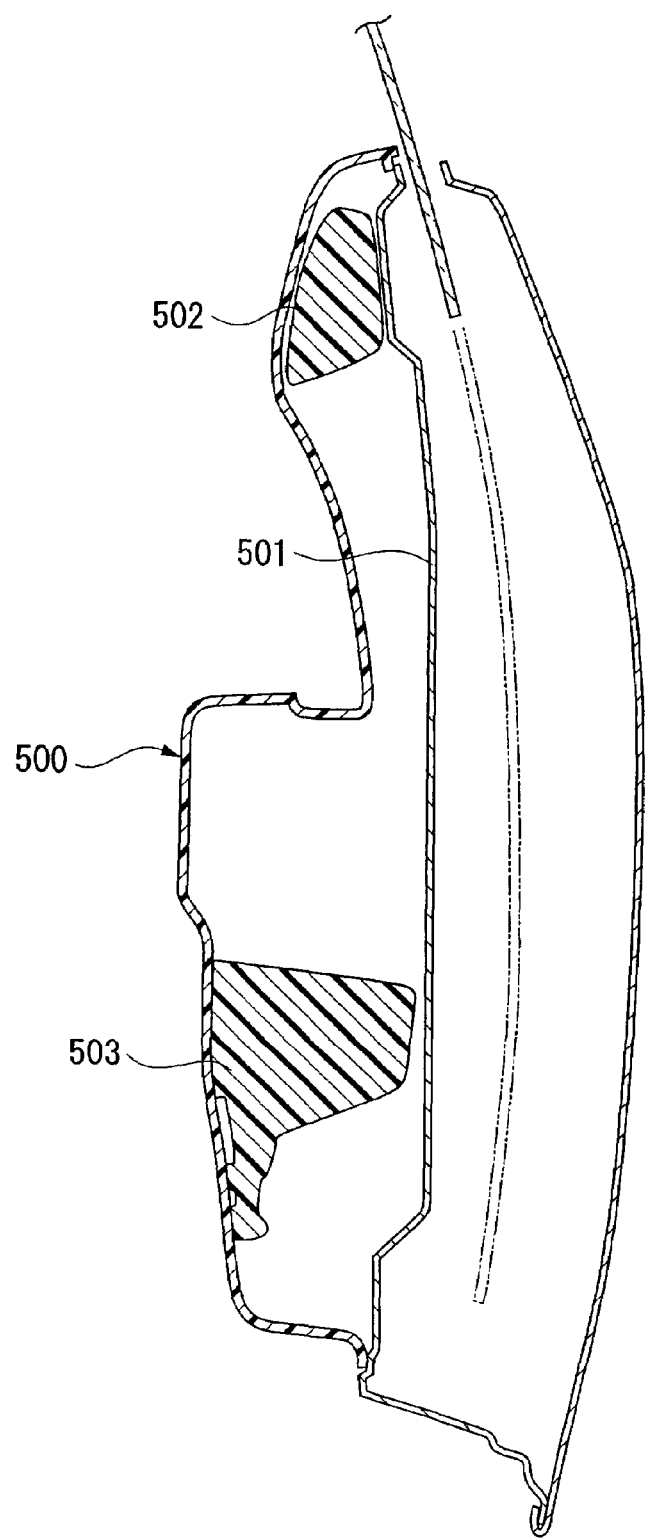
FIG. 17 is a sectional view schematically showing a door to which an air bag device has not been provided.

It is also possible to apply the air bag module shown in the aforementioned second to fourth embodiments to an air bag device that does not have an impact absorption member. FIG. 16 shows such a case. In this drawing, the impact absorption member provided in FIG. 2 is not provided. Otherwise, the structure of the door 12 and the like are common to both.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An air bag device, comprising:
   an air bag that is disposed between an under-window panel disposed under a window and a lining that covers a cabin interior side of the under-window panel, wherein said air bag deploys upward along an inside surface of the window; and
   an impact absorption member that is interposed between the air bag and the lining, said impact absorption member being joined to the under-window panel at locations that are forward and rearward of the air bag.

2. An air bag device according to claim 1, wherein
the impact absorption member includes a first end portion that is joined to the under-window panel at an area below the air bag, a main portion that extends upward from the first end portion between the air bag and the lining, and a second end portion that is on an opposite side of the first end portion, and wherein
a part of the main portion facing the second end portion deforms toward the cabin interior by being pressed by the air bag during deployment of the air bag.

3. An air bag device according to claim 2, further comprising:
an inner panel that extends in the longitudinal direction and is disposed between the window and the lining.

4. An air bag device according to claim 3, further comprising:
side plate portions extending in a lateral direction between the main plate portion and the inner panel, said side plate portions disposed at longitudinal ends of the main plate portion so as to be at both longitudinal sides of the air bag.

5. An air bag device according to claim 4, wherein a plurality of joining pieces are provided in the longitudinal direction at the first end portion of the impact absorption member for attachment points to the inner panel.

6. An air bag device according to claim 1, wherein
the air bag has a plurality of cells provided side-by-side in a lateral direction, with a lower portion of each cell disposed so as to overlap the under-window panel by a predetermined length in a vertical direction during deployment.

7. An air bag device according to claim 6, further comprising
a housing portion for housing the air bag that is provided along a border of the window on the cabin interior side of the under-window panel, wherein
the air bag has a side inflation portion that inflates in the lateral direction from a portion above the housing portion during deployment, and
the lower portion of at least one of the cells overlaps the under-window panel by a predetermined length in the vertical direction during deployment, and an upper portion thereof inclines so as to be positioned within the side inflation portion.

8. An air bag device according to claim 7, further comprising
a coupling member that couples the under-window panel and the air bag, wherein
the coupling member couples a predetermined region of the under-window panel and a predetermined region of the air bag in a range from a middle portion to the upper portion in the vertical direction during deployment of the air bag while overlapping at least one of a cabin interior side portion and a cabin exterior side portion of the air bag during deployment.

9. An air bag device according to claim 8, wherein
the coupling member straddles the top of the air bag to be passed over the cabin interior side portion and the cabin exterior side portion thereof during deployment of the air bag.

10. An air bag device according to claim 6, further comprising
a coupling member that couples the under-window panel and the air bag, wherein
the coupling member couples a predetermined region of the under-window panel and a predetermined region of the air bag in a range from the middle portion to the upper portion in the vertical direction during deployment of the air bag while overlapping at least one of a cabin interior side portion and a cabin exterior side portion of the air bag during deployment.

11. An air bag device according to claim 10, wherein
the coupling member straddles the top of the air bag to be passed over the cabin interior side portion and the cabin exterior side portion thereof during deployment of the air bag.

12. An air bag device according to claim 1, further comprising
a coupling member that couples the under-window panel and the air bag, wherein
the coupling member couples a predetermined region of the under-window panel and a predetermined region of the air bag in a range from a middle portion to the upper portion in the vertical direction during deployment of the air bag while overlapping at least one of a cabin interior side portion and a cabin exterior side portion of the air bag during deployment.

13. An air bag device according to claim 12, wherein
the coupling member straddles the top of the air bag to be passed over the cabin interior side portion and the cabin exterior side portion thereof during deployment of the air bag.

14. An air bag device according to claim 1, wherein the impact absorption member is directly secured to the under-window panel.

* * * * *